(12) United States Patent
Chien

(10) Patent No.: US 10,989,378 B2
(45) Date of Patent: Apr. 27, 2021

(54) LIGHT-UNIT(S) OF LED OR-AND LASER LIGHT-STRING'S HAS MORE ONE SECTIONS HAS DIFFERENT LIGHT PERFORMANCE(S)

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 147 days.

(21) Appl. No.: 16/009,762

(22) Filed: Jun. 15, 2018

(65) Prior Publication Data

US 2018/0299084 A1 Oct. 18, 2018

Related U.S. Application Data

(60) Continuation-in-part of application No. 14/967,862, filed on Dec. 14, 2015, which is a
(Continued)

(51) Int. Cl.
*F21S 4/10* (2016.01)
*F21S 8/00* (2006.01)
(Continued)

(52) U.S. Cl.
CPC ............... *F21S 8/035* (2013.01); *F21K 9/232* (2016.08); *F21S 4/10* (2016.01); *F21S 4/28* (2016.01);
(Continued)

(58) Field of Classification Search
CPC ........ F21S 4/10; F21S 9/02; F21S 4/28; F21S 8/035; F21S 9/03; F21S 10/002;
(Continued)

(56) References Cited

U.S. PATENT DOCUMENTS 10,156,777 B1 * 12/2018 Altamura .................. F21S 4/10
2006/0164831 A1 * 7/2006 Lai ................................ 362/231
(Continued)

*Primary Examiner* — Y M. Lee
(74) *Attorney, Agent, or Firm* — Bacon & Thomas, PLLC

(57) ABSTRACT

The LED or-and Laser light string has more than one light performance functions has LED or-and Laser light bulb which has built-in LED or Laser or both to offer one or more LED or-and Laser light performance or functions select from (I) illumination, (2) projection, (3) party light, (4) lighted patterns, (5) light beams, (6) lighted image, (7) flood light, (8) color changing light (9) garden torch light, (10) garden landscape light string or other light string and all these functions has circuitry and controller built-in only light string or each of light-unit to make LED or-and laser light source(s) to turn on and turn-off or fade-in and fade-in or sequential or flashing or market available light performance which controller is one or more of the following parts including all parts & accessories selected from (i) sensor or photo sensor, motion sensor, (ii) detector or moving detectors, (iii) wireless or remote or IR or RF controller, (iv) switch, manual switch, automatically or timer switch (v) each light source or only light-string has built-in wireless receiver to match the wireless transmitter electric signals; those circuitry and controller is one of (a) built-in the light strings, or (b) built-in one master-control light-unit or each of light-unit, or (c) outside of the light string, or (d) outside the LED or-and laser light-unit housing, or (d) built-in power source, or (e) built-in the said light string or light-unit or LED or-and laser bulb circuity or controller.

15 Claims, 6 Drawing Sheets

Figure 1:
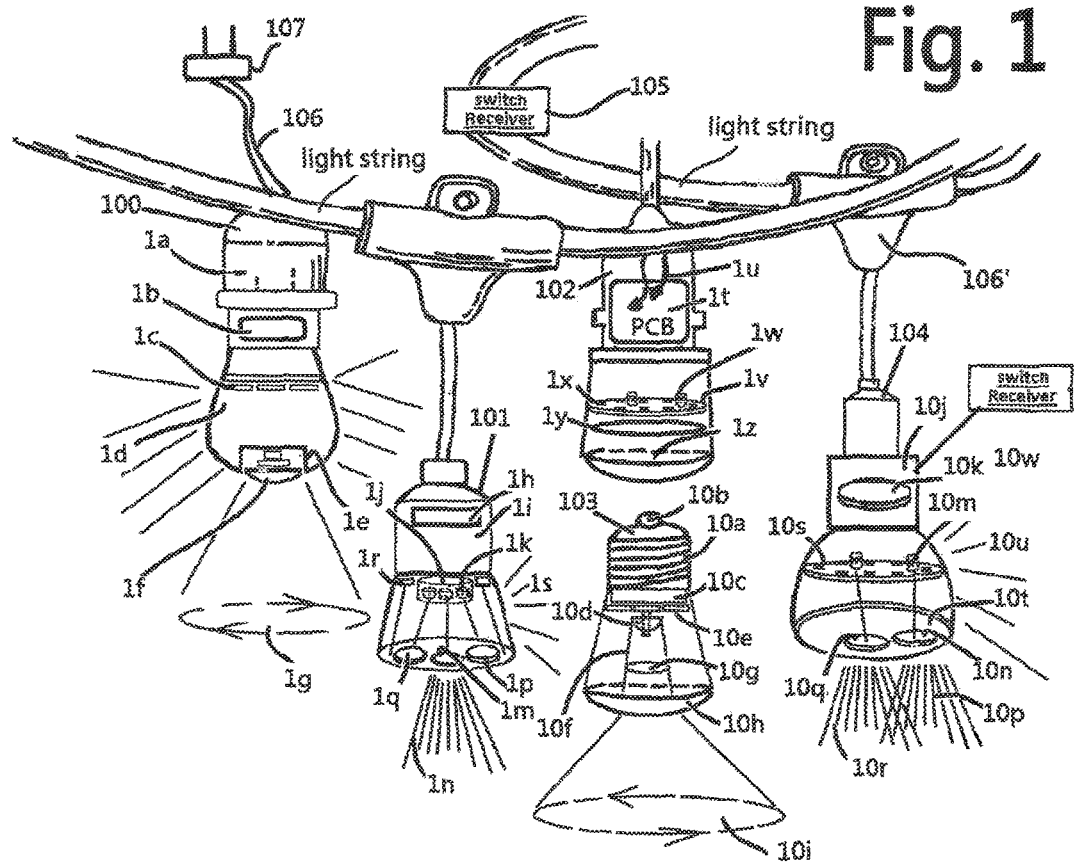
Figure 1:
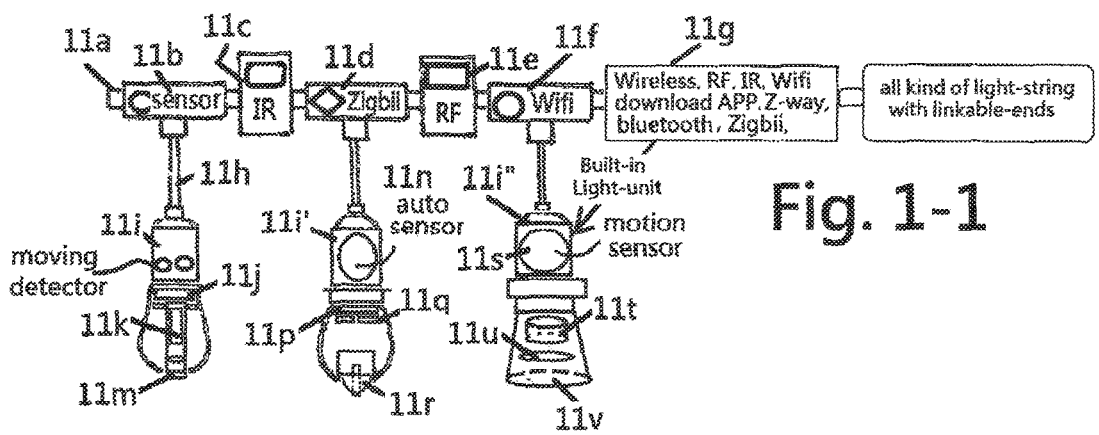

Related U.S. Application Data continuation-in-part of application No. 14/539,267, filed on Nov. 12, 2014, application No. 16/009,762, which is a continuation-in-part of application No. 15/402,965, filed on Jan. 10, 2017, now Pat. No. 10,151,451, which is a continuation-in-part of application No. 14/606,242, filed on Jan. 27, 2015, now Pat. No. 9,541,260, which is a continuation-in-part of application No. 13/367,758, filed on Feb. 7, 2012, now Pat. No. 8,967,831, application No. 16/009,762, which is a continuation-in-part of application No. 15/296,599, filed on Oct. 18, 2016, now Pat. No. 10,228,112, which is a continuation of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, which is a continuation-in-part of application No. 14/023,889, filed on Sep. 11, 2013, now Pat. No. 10,323,811, application No. 16/009,762, which is a continuation-in-part of application No. 15/494,477, filed on Apr. 22, 2017, now abandoned, which is a continuation-in-part of application No. 15/355,515, filed on Nov. 18, 2016, said application No. 14/539,267 is a continuation-in-part of application No. 14/275,184, filed on May 12, 2014, now Pat. No. 10,371,330, said application No. 15/355,515 is a continuation-in-part of application No. 14/289,968, filed on May 29, 2014, now Pat. No. 9,551,477, which is a continuation-in-part of application No. 14/280,865, filed on May 9, 2014, now Pat. No. 9,581,299, which is a continuation-in-part of application No. 13/540,729, filed on Jul. 3, 2012, now abandoned, which is a continuation of application No. 13/296,508, filed on Nov. 15, 2011, now Pat. No. 8,562,158, and a continuation-in-part of application No. 13/296,469, filed on Nov. 15, 2011, now Pat. No. 8,711,216, application No. 16/009,762, which is a continuation-in-part of application No. 15/816,260, filed on Nov. 17, 2017, which is a continuation-in-part of application No. 15/730,350, filed on Oct. 11, 2017, which is a continuation-in-part of application No. 14/967,862, filed on Dec. 14, 2015, and a continuation-in-part of application No. 15/494,477, filed on Apr. 22, 2017, now abandoned, which is a continuation-in-part of application No. 15/355,515, filed on Nov. 18, 2016, said application No. 14/275,184 is a continuation of application No. 12/914,584, filed on Oct. 28, 2010, now Pat. No. 8,721,160, said application No. 15/355,515 is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, which is a continuation-in-part of application No. 13/540,728, filed on Jul. 3, 2012, now Pat. No. 8,834,009, which is a continuation-in-part of application No. 13/296,469, filed on Nov. 15, 2011, now Pat. No. 8,711,216, said application No. 12/914,584 is a division of application No. 12/318,470, filed on Dec. 30, 2008, now abandoned, application No. 16/009,762, which is a continuation-in-part of application No. 15/170,071, filed on Jun. 1, 2016, which is a continuation-in-part of application No. 14/844,314, filed on Sep. 3, 2015, which is a continuation of application No. 12/938,564, filed on Nov. 3, 2010, now Pat. No. 9,239,513, which is a continuation-in-part of application No. 12/886,832, filed on Sep. 21, 2010, which is a continuation-in-part of application No. 12/624,621, filed on Nov. 24, 2009, now Pat. No. 8,303,150.

(51) Int. Cl.

| | | |
|---|---|---|
| *F21V 23/04* | (2006.01) | |
| *F21S 10/00* | (2006.01) | |
| *F21V 29/00* | (2015.01) | |
| *F21S 4/28* | (2016.01) | |
| *F21K 9/232* | (2016.01) | |
| *F21V 21/22* | (2006.01) | |
| *F21S 9/02* | (2006.01) | |
| *F21V 14/08* | (2006.01) | |
| *F21V 13/02* | (2006.01) | |
| *F21V 14/06* | (2006.01) | |
| *F21V 23/00* | (2015.01) | |
| *F21V 14/00* | (2018.01) | |
| *G03B 23/00* | (2006.01) | |
| *F21V 17/02* | (2006.01) | |
| *F21V 33/00* | (2006.01) | |
| *G02F 1/13* | (2006.01) | |
| *F21S 10/02* | (2006.01) | |
| *F21S 9/03* | (2006.01) | |
| *G03B 29/00* | (2021.01) | |
| *F21V 21/29* | (2006.01) | |
| *F21Y 115/10* | (2016.01) | |
| *F21W 121/00* | (2006.01) | |
| *G03B 21/14* | (2006.01) | |
| *F21V 21/30* | (2006.01) | |
| *F21V 21/14* | (2006.01) | |
| *F21V 21/08* | (2006.01) | |
| *F21Y 101/00* | (2016.01) | |
| *F21V 5/04* | (2006.01) | |
| *G03B 21/20* | (2006.01) | |
| *F21W 131/109* | (2006.01) | |
| *F21Y 103/33* | (2016.01) | |
| *F21Y 115/30* | (2016.01) | |
| *G03B 23/08* | (2006.01) | |

(52) U.S. Cl.
CPC . *F21S 9/02* (2013.01); *F21S 9/03* (2013.01); *F21S 10/002* (2013.01); *F21S 10/007* (2013.01); *F21S 10/02* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/22* (2013.01); *F21V 23/00* (2013.01); *F21V 23/04* (2013.01); *F21V 23/0435* (2013.01); *F21V 29/00* (2013.01); *F21V 33/0052* (2013.01); *G02F 1/1313* (2013.01); *G03B 23/00* (2013.01); *G03B 29/00* (2013.01); *F21V 5/04* (2013.01); *F21V 21/08* (2013.01); *F21V 21/14* (2013.01); *F21V 21/29* (2013.01); *F21V 21/30* (2013.01); *F21V 23/0442* (2013.01); *F21V 23/0471* (2013.01); *F21W 2121/00* (2013.01); *F21W 2131/109* (2013.01); *F21Y 2101/00* (2013.01); *F21Y 2103/33* (2016.08); *F21Y 2115/10* (2016.08); *F21Y 2115/30* (2016.08); *G03B 21/142* (2013.01); *G03B 21/2046* (2013.01); *G03B 23/08* (2013.01); *Y10S 362/80* (2013.01); *Y10S 362/806* (2013.01)

(58) Field of Classification Search
CPC ....... F21S 10/02; F21S 10/007; G02F 1/1313; F21V 21/22; F21V 5/04; F21V 21/08; F21V 21/14; F21V 21/30; F21V 23/0442; F21V 23/0471; F21V 23/0435; F21V 21/29; F21V 23/04; F21V 14/06; F21V 17/02; F21V 14/006; F21V 23/00; F21V 13/02; F21V 14/08; F21K 9/232; F21Y 2115/30; F21Y 2115/10; F21W 2131/109; F21W 2121/00; G03B 21/2046; G03B 23/00; Y10S 362/806

See application file for complete search history.

(56) References Cited

U.S. PATENT DOCUMENTS

| | | | | |
|---|---|---|---|---|
| 2007/0127258 A1* | 6/2007 | Wang | ............. | G02B 6/4204 362/559 |
| 2019/0373817 A1* | 12/2019 | De Samber | ............. | F21S 4/20 |

\* cited by examiner

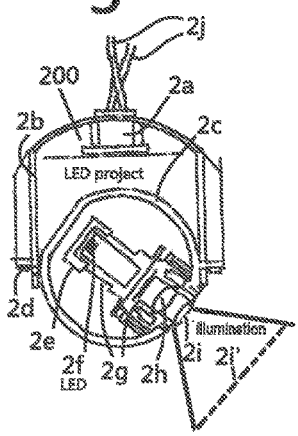
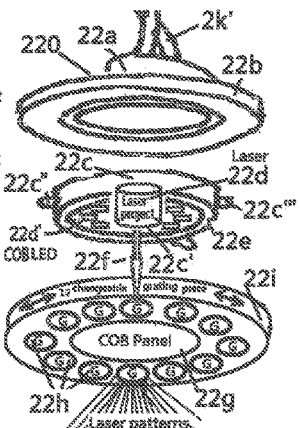
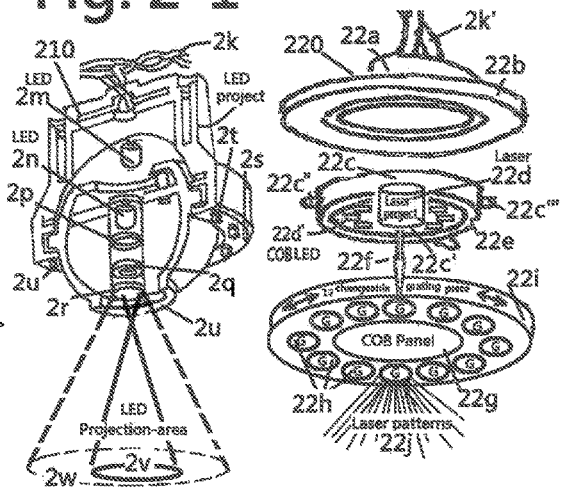
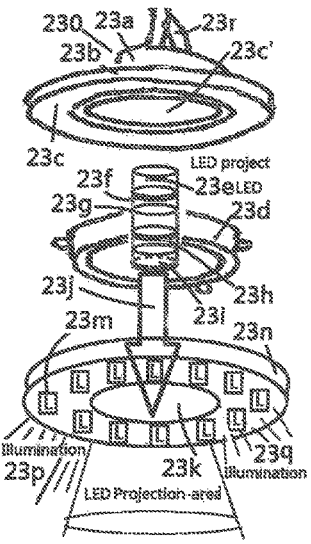
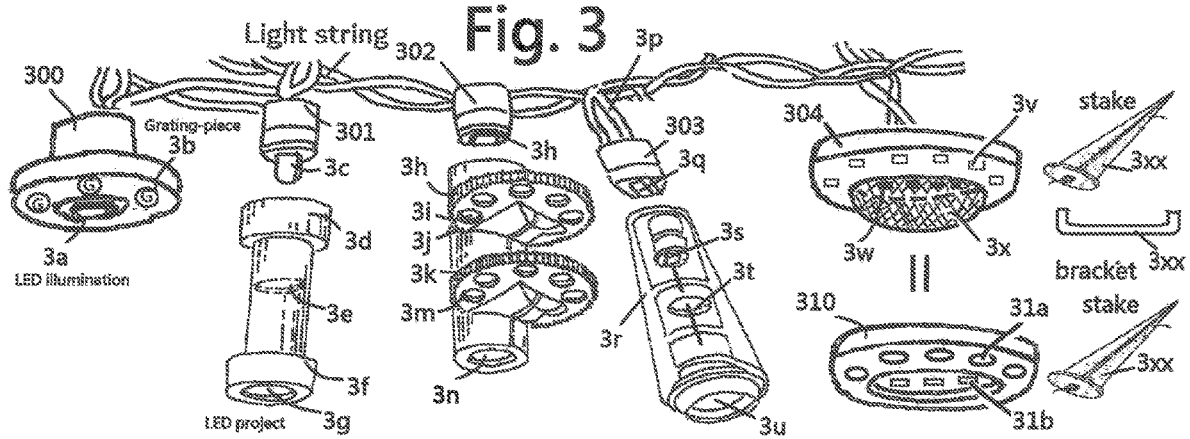
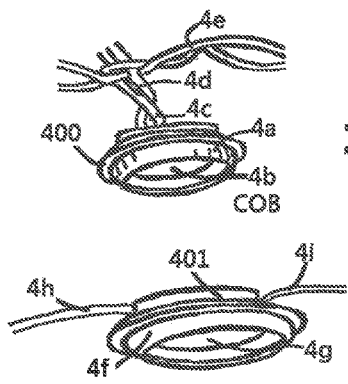
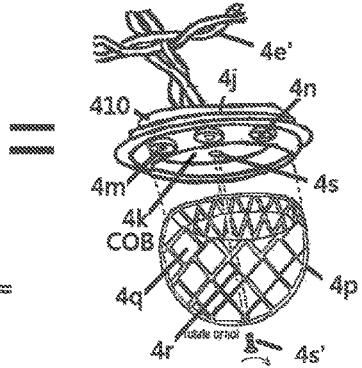
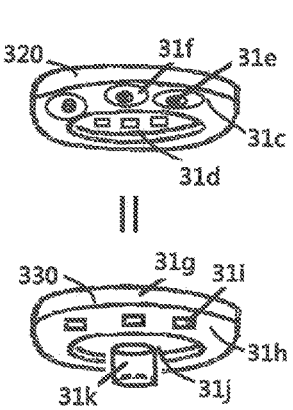

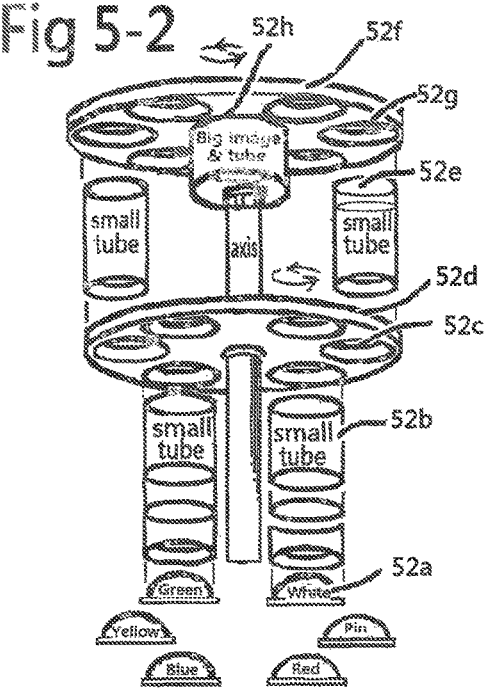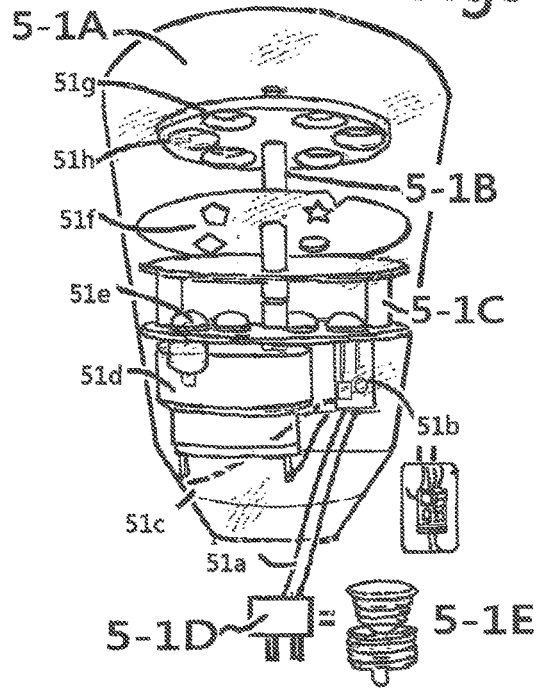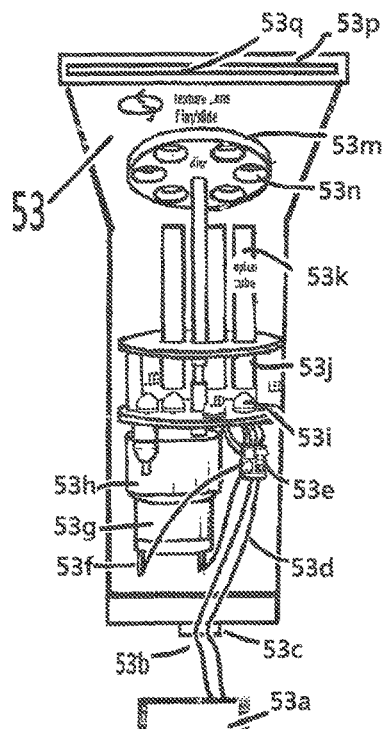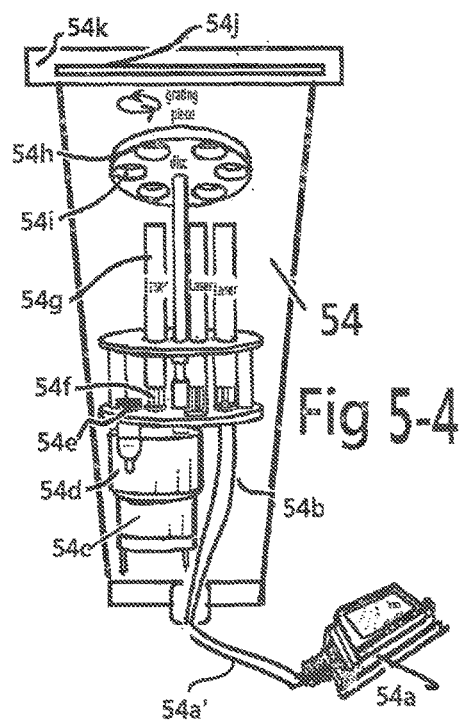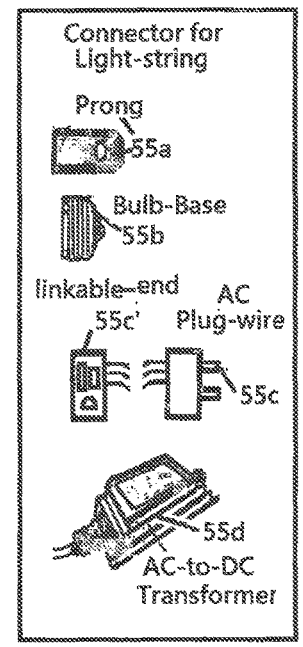

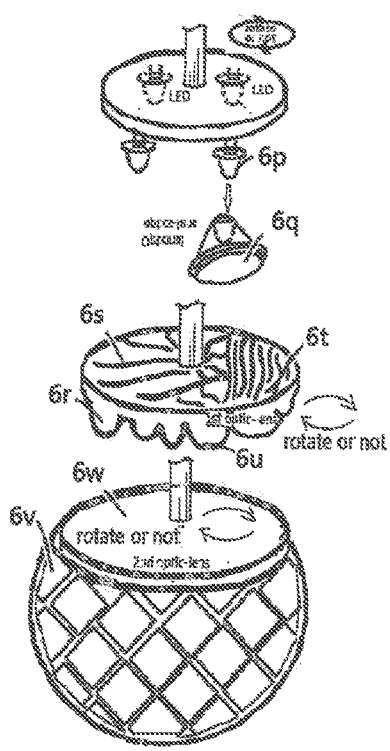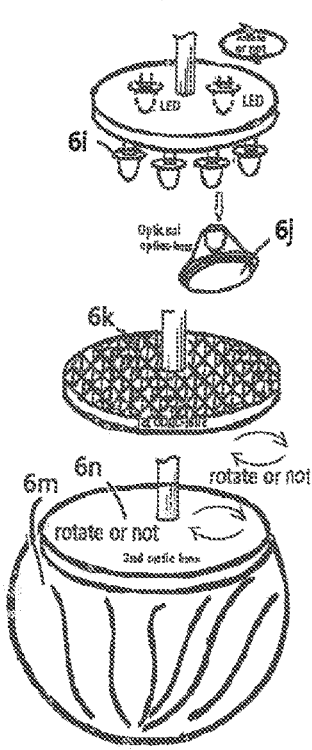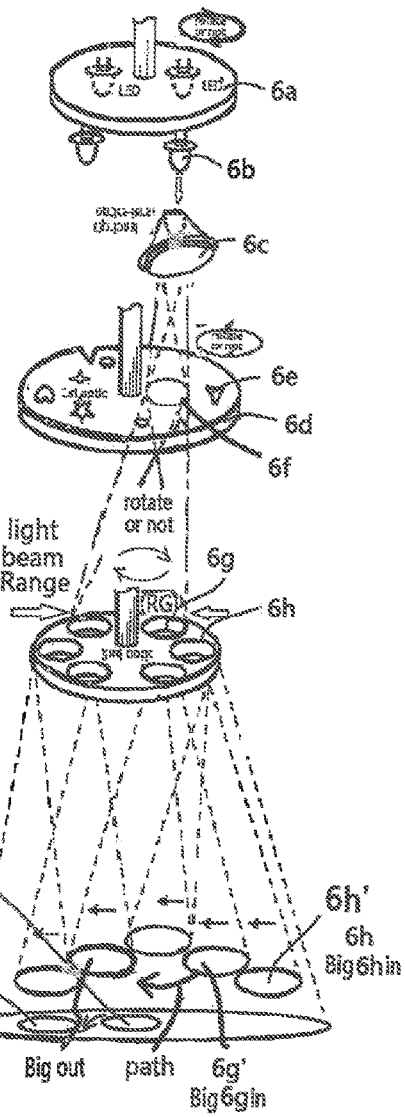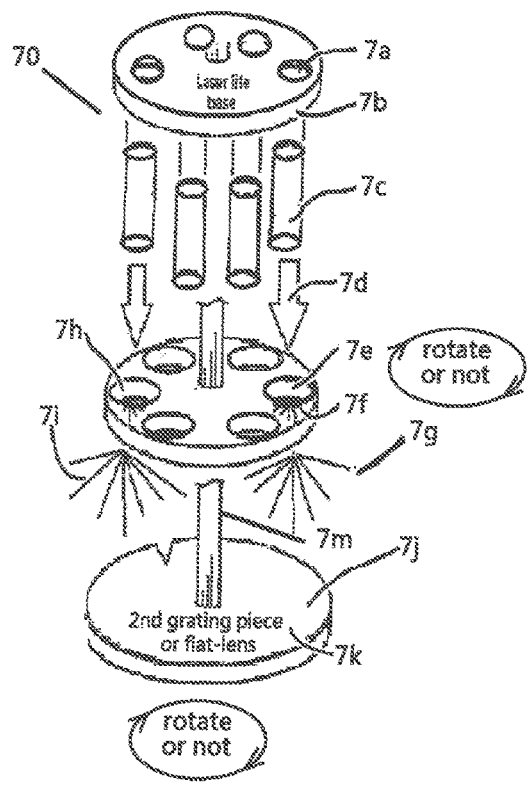

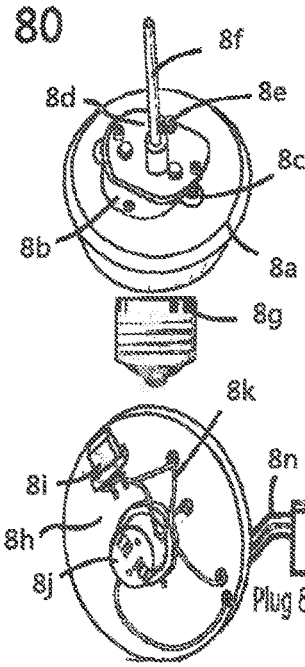
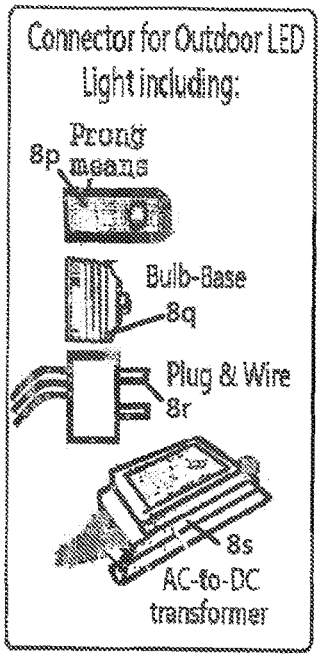
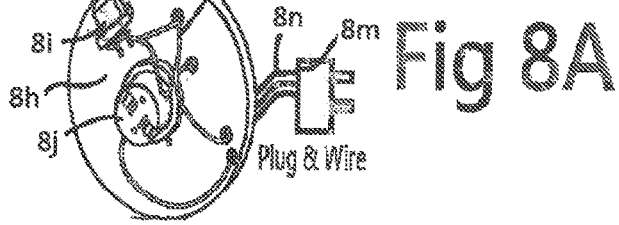
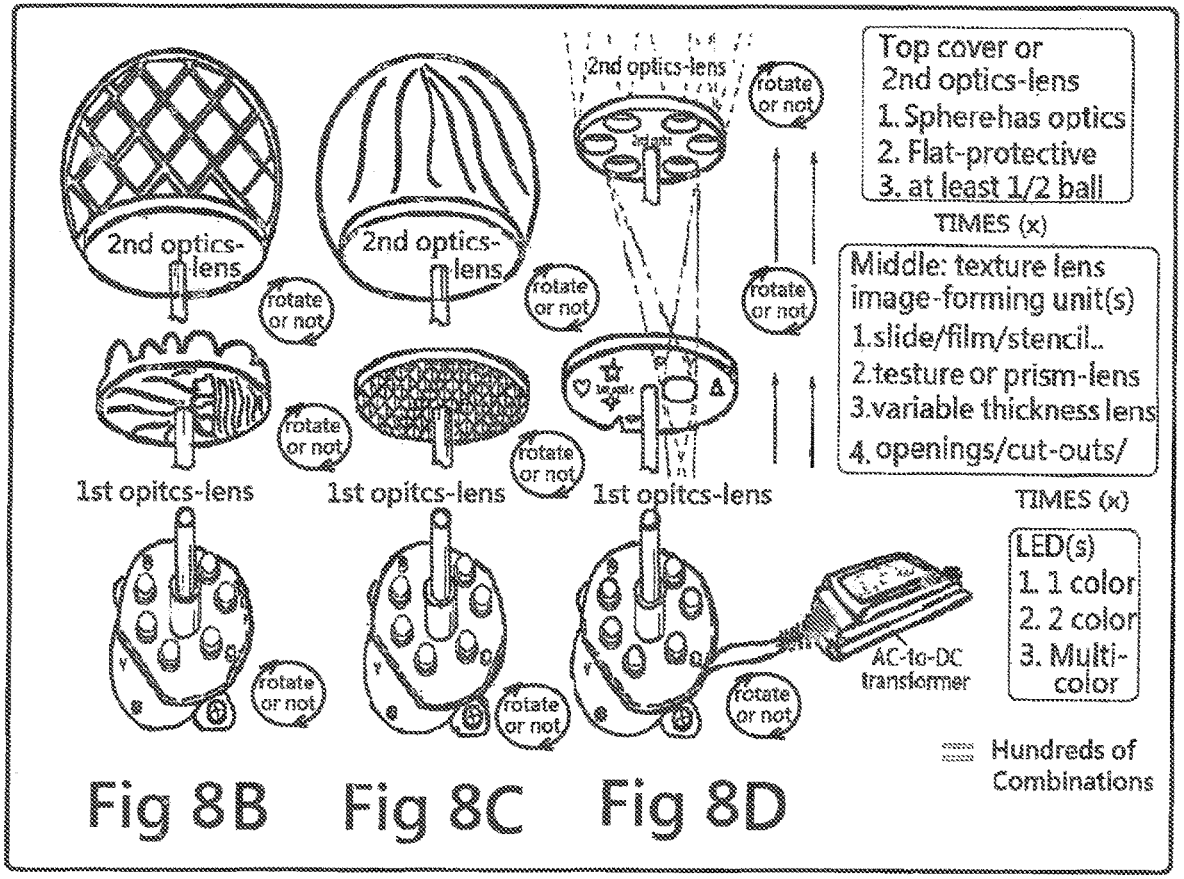

LIGHT-UNIT(S) OF LED OR-AND LASER LIGHT-STRING'S HAS MORE ONE SECTIONS HAS DIFFERENT LIGHT PERFORMANCE(S)

PARENT FILED CASE

The current invention is Division filed of the
(#QQQ-3-1) U.S. application Ser. No. 15/816,268 filed on Nov. 17, 2017,
Which is CIP of
(#QQQ-3-2) U.S. application Ser. No. 15/730,350 filed on Oct. 11, 2017,
Which is CIP of
(#FF-5) U.S. application Ser. No. 15/730,291 filed on Oct. 11, 2017,
Which is CIP of
(#QQQ-7) U.S. application Ser. No. 15/494,777 filed on Apr. 24, 2017
which is continue in part of
(#QQQ-6) U.S. application Ser. No. 15/355,515 filed on Nov. 18, 2016
which is continue in part of
(#QQQ-5) U.S. application Ser. No. 15/341,782 filed on Nov. 11, 2016
which is continue in part of
(#QQQ-4) U.S. application Ser. No. 15/348,218 filed on Nov. 10, 2016
which is continue in part of
(#QQQ-3) U.S. application Ser. No. 14/983,993 filed on Dec. 30, 2015
Now is allowanced which is continue in part of
(#QQQ-2) U.S. application Ser. No. 14/289,968 filed on May 29, 2014
Now is U.S. Pat. No. 9,551,477 which is continue in part of
(#QQQ-1) U.S. application Ser. No. 14/280,865 filed on May 19, 2014
Now is U.S. Pat. No. 9,581,299 which is continue in part of
(#QQQ-2012) U.S. application Ser. No. 13/540,728 filed on Jul. 3, 2012 now is U.S. Pat. No. 8,834,009 which is Division filed of
(#JJJ-1) U.S. application Ser. No. 13-296,469 Filed on Nov. 15, 2011 now is U.S. Pat. No. 8,711,216
(#DD-CIP) U.S. application Ser. No. 14/944,953 filed on Nov. 18, 2015
which is Continue in Part of
(#AAA) U.S. application Ser. No. 12/984,583, Filed on Now
is U.S. Pat. No. 9,157,589 which is Continue in Part of
(#TT-2) U.S. application Ser. No. 14/968,250, Filed on Dec. 14, 2015
which is Continue in Part of
(#TT-1) U.S. application Ser. No. 14/944,953, Filed on Nov. 18, 2015
which is Continue in Part of
(#TT-12) U.S. application Ser. No. 12/866,832, Filed on Sep. 21, 2010
This is CIP filing for
(#II-2) U.S. application Ser. No. 13/540,689 filed on Jul. 3, 2012. Publication data US 2012-026 8668 dated on Oct. 25, 2012.
This is continue in part of
(#II-1) U.S. application Ser. No. 13/534,611 filed on Jun. 27, 2012, publication data US 2012/0268947 dated on Oct. 25, 2012
This is continue in part of
(#11-2009) U.S. application Ser. No. 12/624,621 filed on Nov. 24, 2009, publication data US2010/0214541 date Aug. 26, 2010
This is Division filing for
(#FF-4) U.S. Pat. No. 14,967,862 filed on Dec. 14, 2015, now U.S. Pat. No. 10,859,221,
which is CIP for filing of
(#FF-3) U.S. application Ser. No. 14-539,267 filed on Nov. 12, 2014,
which is CIP for filing of
(#FF-2) U.S. application Ser. No. 14-275,184 filed on May 12, 2014, now U.S. Pat. No. 10,371,330,
which is CIP for filing of
(#FF-1) U.S. application Ser. No. 12-886,832 filed on Sep. 21, 2010 now is U.S. Pat. No. 8,721,160 which is CIP for filing of
(#FF-2008) U.S. application Ser. No. 12-318,470 filed on Dec. 30, 2008 now abandoned, which is Division for filing of which is Division for filing of
(#Q-2007) U.S. application Ser. No. 11-806,284 Filed on Dec. 15, 2007 now is U.S. Pat. No. 7,630,004

BACKGROUND

The current invention offer a light string has built-in or injected or added-on LED or-and laser bulb or other light-unit(s) which has more than one or more functions for the said light string which selected from
(1) illumination, (2) projection, (3) party or garden or patio light string,
(4) present moving lighted patterns, lighted image, light beams light string,
(5) outdoor plants or tree or fence or garden light string for all purpose
(6) light-string has project remote areas or supply near-by illumination or both locations lighted image, (7) flood or torch or accent light, (8) seasonal or holiday light string, (9) garden or outdoor or backyard landscape light string, (10) other functions light string;
for desired LED or-and Laser light performance including;
   (i) color changing light,
   (ii) Selected color,
   (iii) laser light patterns in array or dot-matrix, contour shape image, hologram image, grating film image,
   (iv) LED light-beam, LED lighted patterns, LED lighted image,
   (v) combine the LED and Laser light all kind of light-beam, lighted patterns, lighted image or desired combination for these light-beam, lighted patterns, lighted image.
   (vi) Other LED or-and Laser light performance from market place.
By the circuit and control kits which is built-in or injected-out or added-on or outside the said LED or-and laser light bulb or other light-unit(s), or built-in light string, or outside the said LED bulb or other light-unit(s), or outside the said light string; those including one or more controller may selected from
(a) All kind of sensor, photos sensor, motion sensor, moving detectors
(b) detector or moving detectors,
(c) wireless or remote or IR or RF controller,
(d) switch, manual switch, automatically switch
(e) each light source has built-in wireless receiver to match the wireless transmitter electric signals (f) All kind of blue tooth, or z-way, or Zigbii, or wife with download APP software or other wireless receiver and transformer, internet with 3/4/5G or future wireless communication.

To make the said LED or-and laser light source(s) inside the said light-unit(s) or LED or-and laser bulb which is assembled or injected type to has one or more desired light performance selected from;
(1) Color changing or color selected or color pre-determined.
(2) Brightness adjustable or dimmer able or hi-low brightness
(3) Function selection between
  (3-1) illumination,
  (3-2) projection,
  (3-3) flood light,
  (3-4) accent light,
  (3-5) seasonal light,
  (3-6) holiday light,
  (3-7) Commercial light,
  (3-8) torch light,
  (3-9) 1 or 2 or more light source(s) install or assembled or injected or added-on Plurality of light-unit(s) light strings . . . . To make at least or more than one functions or light effects as below:
    (3-9-1) turn on/off,
    (3-9-2) fade-in/out,
    (3-9-3) sequential at different time/duty/cycle/period of time, or in one time,
    (3-9-4) sound activated the each or all light-unit(s)
    (3-9-5) trigger with timer (day/week/month) setting and programs.

BRIEF DRAWING

FIG. 1 show variety of light string has more than one functions including LED or-and laser illumination or projection or power fail light or party light.

FIG. 1-1 show the preferred variety of light-string has different control system including but not limited for all kind of (a) sensor, (b) IR, (c) Zigbee, (d) RF, (eO wifi, (f) wireless or RF or wifi or remote controller for built-in light-string; or the controller install on one light source including or but not limited for all kind of (1) moving-detector, (2) Auto sensor, (3) motion-sensor with or without master-controller which can be activated and also triggered other linkable light source.

Figures 1, 2:
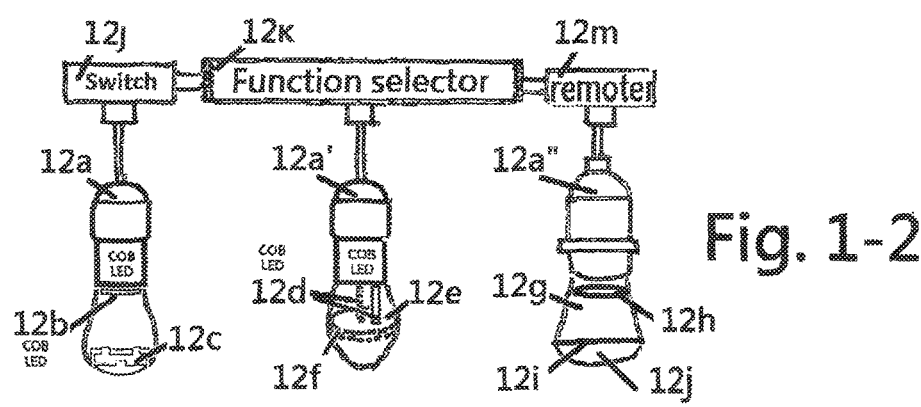

FIG. 1-2 show the adjustable or changeable or setting light source system can incorporated built-in light string or built-in one or all light-units by (1) switch, or-and (2) function selector, or-and (3) remote controller, or-and (4) adjustment device including (i) dimmable circuit, or-and (2) color changing circuit, or-and (3) color selection circuit, or-and (4) IC, or-and (5) changing moving light effects, or-and (6) light source sequential, flashing, fade-in or fade-out, random flash, flash on different time, different duty, cycles, brightness, colors, period of time or other light effects, or-and (7) any combination of LED, COB LED, dice or chip or dip LED(s), or (8) has other added functions including (i) power fail, or-and (ii) motion sensor, or-and (iii) moving detector, or-and (iv) switch, or-and (v) IC with pre-determined activate light-units, or-and (vi) predetermined built-in light string or light-unit(s) for trigger system with master to operate the linkable other light units.

FIGS. 2, 2-1, 2-2, 2-3 show the variety light-unit(s) has preferred combination light-source for per-determined combination function for the said LED or-and Laser light string.

FIGS. 3, 3-1, 4, 4-1 show the different construction, combination of functions for LED or-and laser light unit(s) with pre-determined the said (i) optics-lens, or-and (ii) convex-lens, or-and (iii) diamond construction optics-lens, or-and (iv) LED projection assembly. Laser projection assembly, or-and (v) has at least one grating-piece or grating-film, or multiple level grating-piece; for fixed position or moving or movable.

Figure 5:
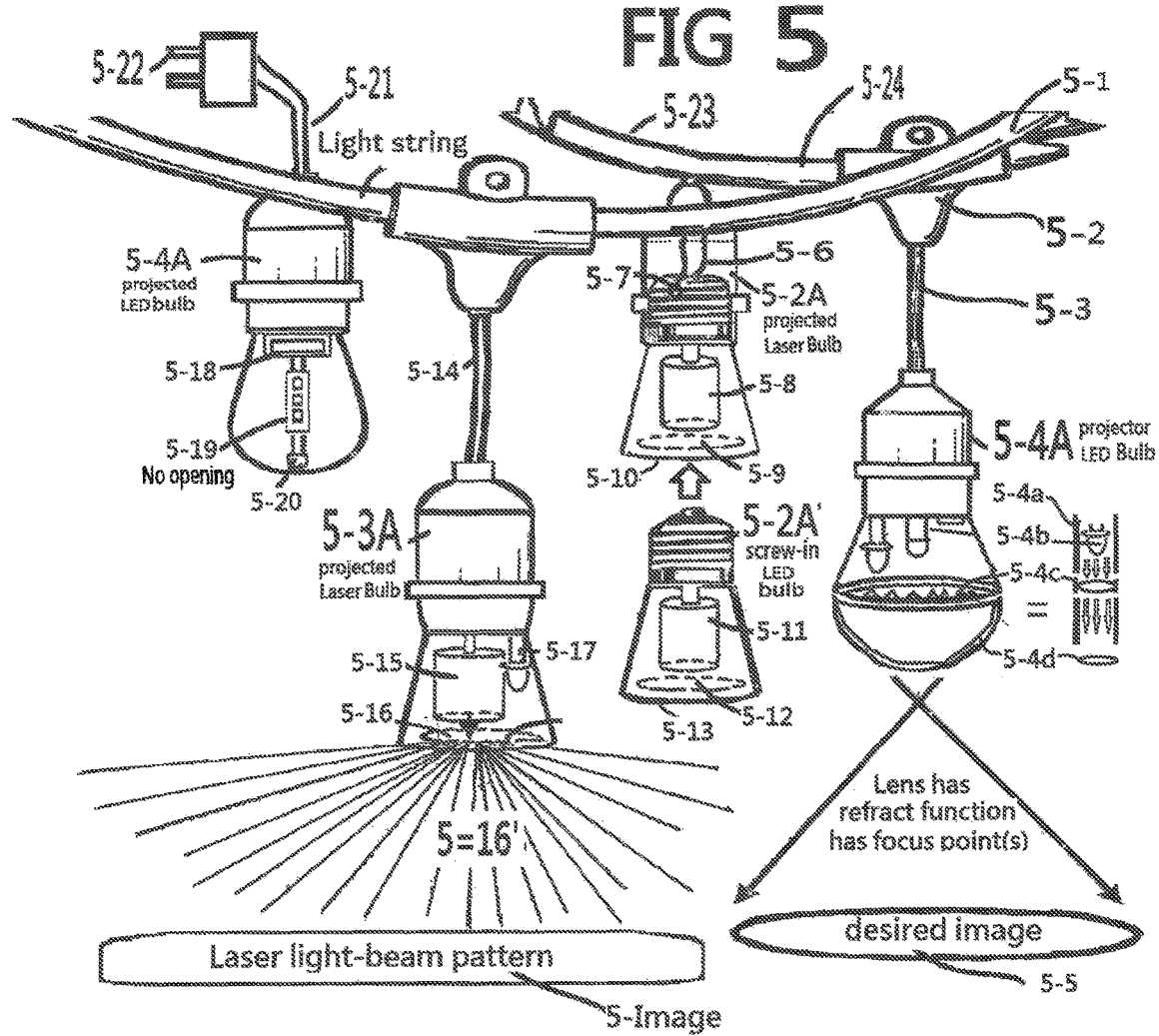

FIG. 5 show the alternative or replace arrangement or equal function different light string for patio or indoor light string which has different light-unit for (1) different light effects, (2) offer near-by illumination or-and remote areas projection light effect, (3) has desired controller systems or light-unit(s) or built-in light-string or light units, (4) has function selection, (5) has dimmable or brightness or color or light effects selection, adjustable, setting, (6) has built-in turn on/turn off switch or timer switch or activated by built-in light string or light-unit for switch, sensor, motion sensor, moving detectors, auto/photo sensor. Zigbii system, wifi system, RF or IR remote controller, blue-tooth system, to trigger different light-unit(s), (7) light source may selected from (i) COB LED, (2) LED in all kind of specification, (3) Laser diode or laser module or laser assembly, (4) LED projection assembly, (5) laser project assembly, (6) has desired optics-lens, treated lens, $1^{st}$ and $2^{nd}$ optics-lens (7) reflective or refractive or diffusion or protective lens.

From FIGS. 5-1, 5-2, 5-3, 5-4 show one of moving lighted image or pattern or light beam has at least one or plurality of moving optics-lens along the axis of movement or motor or motor/gear assembly.

From FIG. 5-5 show the preferred power source for current invention but not limited for these 4 preferred power source(s).

From FIGS. 6 and 6A, and 6B and FIG. 7 show the details for different construction for the details parts.

From FIGS. 8, 8A, 8B, 8C, 8D show one of the embodiments for the said movement(s) all different main moving device and incorporate with $1^{st}$ and $2^{nd}$ optics-lens.

DETAIL DESCRIPTION

The current invention make big improvement of current market light string only had one kind of light source such as incandescent or LED which do not have current invention at least to kind of light effects selected from;

The current invention for LED or-and laser light-string to offer features including
1. One light-string has plurality number of light-unit(s) with desired or different light-source(s).
2. One light-string has more than one of light-source(s) to make different light effects.
3. One light-string has COB (Chip on Board) LED light-source to offer simple installation and super brightness and lower cost and value appearance.
4. One light-string has plurality of injected light-unit(s) or screw-in or add-on or assembled to the light-string each or partial or all light-unit(s)
5. One light-string has $1^{st}$ and $2^{nd}$ or more optics-lens with reflective or-and refractive or-and discussion optics-lens, or-and optic-elements which has opening(s), cutout(s), window(s) (which is punch-through type), film, slide, stencil, displayer, screen, LCD screen, or wireless screen, internet download show on displayer.
6. One light-string has laser light source and desired number of grating-piece in front of the said laser-beams to split or divide the original higher-wattage laser beam to split into plurality number of the lower-wattage laser-beam, lighted image, lighted patterns.
7. One light-string has built-in more than one for the different light-source.
8. One light-string has desired at least one or more than one of trigger system
    Selected from the switch, photo sensor, motion sensor, moving detectors, sound sensor, vibration sensor, shacking sensor or any combinations of all market available sensor or switch built-in or outside of the said one or more light-unit(s) or-and light-string.
9. One light-string has desired number of circuitry or controller to make desired at least or more than one of light functions or light effects at least including;
    color changing, color selection, functions changing, function selection,
    brightness changing, brightness selection, dimmer function, power fail functions, motion sensor functions, sound activated function, moving light functions, projection functions, one or both of near-by and far-away locations illumination. Light-beam or-and lighted patterns or-and lighted image functions.
10. One light-string has desired number of circuity or controller to make the said at least or more than one of the light-unit(s) to turn-on or turn-off, or-and color changing, mixing, or-and brightness adjustable, or-and light effects changing from steady, chasing, sequential, fade-in and fade-out, random flash, pair-flashing or other light-effects available at market place. Here just list limited type.
11. One light-string has power source can get from AC-plug wire, AC prong, DC battery, or built-in or outside AC-to-DC circuit or transformer, or solar power.
12. One light-string has wired or wireless control or adjustment or setting or change functions by Bluetooth, Z-way, ZigBii, Wifi, download APP software, internet, 3/4/5G network to make wireless control the said at least or more than one of the light-unit(s) or light strings.
13. One light-string has outlet end to link to other one or more light-string to make sufficient light-string surrounding the said building, house, garden, fence, pathway or any areas or location.
14. One light-string has adjustable or movable or changeable light-beam or lighted-patterns or lighted-image made by motor, gear set, clock movement, magnetic-unit(s) with magnetic-coil for magnetic reaction set, cam and belt or other rotating or spin device or set to make the textured optics-lens or optics-element or light-source or optics-pied, grating-piece to manually or automatically rotating, spinning, moving, shaking, waving, vibration, or light-source(s) on and off on different time or period of time to make movable effects.

These (14) basic and limited features is part of current invention and is more upgrade than the co-inventor co-pending filed case as below;
(#TT-2) U.S. application Ser. No. 14/968,250, Filed on Dec. 14, 2015
which is Continue in Part of
(#TT-1) U.S. application Ser. No. 14/944,953, Filed on Nov. 18, 2015
which is Continue in Part of
(#TT-12) U.S. application Ser. No. 12/866,832, Filed on Sep. 21, 2010
This is CIP filing for
(#II-2) U.S. application Ser. No. 13/540,689 filed on Jul. 3, 2012. Publication data US 2012-026 8668 dated on Oct. 25, 2012.
This is continue in part of
(#M) U.S. application Ser. No. 13/534,611 filed on Jun. 27, 2012, publication data US 2012/0268947 dated on Oct. 25, 2012
This is continue in part of (#II-2009) U.S. application Ser. No. 12/624,621 filed on Nov. 24, 2009, publication data US2010/0214541 date Aug. 26, 2010

It is appreciated all the co-pending case all features and functions and construction and all skill disclosure on all co-pending or co-filed case for any replaceable skill or equal functions or alternative skill should be all still fall within the current invention scope and claims which should not be a prior art for current invention basing on CIP and continuous filed case from all co-inventor co-pending or issued patents.

From FIG. 1 show the light-string for outdoor application including patio, house, wall, fence, garage door, garden has plurality of light-unit(s) (100) (101) (102) (103) (104) and each one of the said light-unit has more than one functions from built-in preferred light source. By way of example and without limitation such as;

(A) From light-unit (100) is a injected the unit-base (1*a*) with built-in circuitry or-and controller or-and wireless receiver (1*b*) totally sealed with the light-string wire, and the sealed unit has desired geometric at least one or more than one housing (1*d*) that has inner space has dice, chip, dip, COB LED (1*c*) to offer illumination while the light-unit (100) get power from the AC-Plug (107) wire (106) or other conductive-connector with wire or prong or bulb base into the circuitry or controller (1*b*) inside the top housing part (1*a*) or get power from the outside transformer and connect with inner circuit or-and controller (1*b*) to supply desired power to the said each or all light-unit of said light-string, or-and (B) From light-unit (100) is a injected with light-string wire and sealed for very good water and environment light-unit has housing with built-in dip, dice, chip or COB (chip on-board, hereafter as COB) LED(s) and the said LED(s) has front of textured or treatment dome optic-cover assembly (1*f*) to create and project desired light-beam or patterns or lighted image on desired location (1*g*) by the front positioned optics-cover or-and built-in or extra inner piece having the said reflective or-and refractive or diffusing or protective property of said inner or-and outer cover (1*f*) basing focusing theory. Wherein the said at least one housing means the existing geometric housing (1*d*) and may has $2^{nd}$ outer housing to sealed the whole (100) so the $2^{nd}$ functions light-function (1*f*) will not open to touch by people and also can prevent water to get into, or-and (C) From light-unit (101) has geometric housing and inner space has built-in more than one of laser light source (1*j*) (1*k*) and has respectively front grating or hologram piece(s) (1*m*)(1*p*) which will split or divided the original higher wattage laser-beam emit out from laser light-source (1*j*) (1*k*) to plurality of laser light-beam (1*n*) or laser lighted-patterns (not shown) or lighted-image (not shown) in desired arrangement in matrix or array or other pre-determined arrangement(s), or-and (D) From Light-unit (101) has $2^{nd}$ type of light-source (1*r*) which is chip or dice or dip or COB LED(s) and go through the circuit or controller or wireless receiver inside the PCB (1*h*) inside the housing-part (1*i*) to offer the illumination or light-beams or lighted patterns (1*s*) which has IC or MCU or MPU to create the color changing or color automatically changing or color mixing functions, brightness adjustable functions, wireless receiver to receive any wireless transmitter electric signals for setting, adjustable, variable or changing function from IR, RF, Z-way, Zigbi, wife, download APP software through internet or 3/4/5G network. The said built-in LED(s) offer the LED light effects which available from market place by way of example and without limitation, such as fade-in and fade-out, chasing, sequential, pair-flashing, random flashing, sound activated or sound changing brightness or-and color, or other market available LED light effects is appreciated should still fall within the current invention and claims.

(E) From light-unit (102) has alternative arrangement for light-unit (102) which has one or more than one or all same or different light-unit (100) or-and (101) or-and (102) in one light-string. By way of example and without limitation, such as light-unit (102) which has injection top housing-part which has conductive-piece(s) to get power from light-string which has built-in or outside switch or receiver (105) to make the said light-unit (105) to activate for desired light-effects while the power into the PCB (10 and inner circuitry or receiver or controller will offer electric-signals to the said light-source board (1x) for desired number of light-source including all kind of LEDs (1v) or all kind of laser light source (1w) to operate the predetermined light function or light effects as above discussed for light-unit(s) (100) (101). Under the light-source board (1x) has optional inner optics-piece which may is optic-lens with reflective or-and refractive or-and diffusion or-and focus or-and protective properties (1y) or is optics-element (1y) with pin-hole image properties, piece with opening(s), piece with cutout(s), piece with windows (not punch through), piece with painting, piece with grating-elements; with rotating or spinning or shaking or vibration or moving or waving to increase exciting or splendid light-effects than only single one of front geometric optics-lens or cover (1z). Wherein the said light-unit (102) also can he semi-injected piece which means the said light-unit the said light-source (103) has its owned electric-contact (10a) (10b) on the bulb-base conductive-piece which get power from the said light-unit inside female bulb-socket (not shown) so the light-source (103) can be replaced basing on different season or different timing or be replaced while light-source (103) out of functions.

(F) From light-source (103) has LED with non-rotating optics-lens assembly (10d) and built-in plurality number and color LEDs to use the IC or MCU or MPU to drive each different LED for on/off time or cycle or duty or frequency of Red, Green, Blue color LEDs also mix the desired color LEDs for the duty and cycles such as 50% red and 50% blue on time together to get purple light color and reduce or increase any one of Red and Blue to get deeper or lighter purple colors . . . for mixing colors and go through front texture or treated optics-lens has reflective or-and refractive or-and diffusion or-and protective or-and focusing properties to get desired splendid and changeable and variety different light show on the desired location (10i) mainly for light-string is for down-light performance. Also, The light-source (103) also has the other LED (10e) inside the light-source (103) to offer the illumination as the other embodiment (100) LED (1c) to created other single illumination purpose light-string light effects.

(G) From light-unit (104) show one of the light-unit of the light-string which is injected together with wire of the said light-string and the holder (106').

The said light-unit (104) has top housing-part and space (10j) to install the PCB (10k) which has desired circuitry or-and controller or-and wireless receiver or-and IC, MCU, MPU or-and sound-sensor or-and photo-sensor or-and motion sensor or-and other sensor or sensor-assembly to supply the electric-signals to the said light-source board which has desired laser light source (10m) or-and all kind of LEDs (10s) to make illumination (10u) or laser light-beam or laser lighted-patterns or laser-images (10p) (10r) while the laser light-source (10m) to emit the higher wattage laser-beam go through the front grating-piece (10n) (10q) to make single laser higher wattage laser-beam split or divided into plurality of lower-wattage laser-beam or laser-patterns or laser-images (10p) (10r). From the light-unit (104) of the said light-string which also has outside switch or wireless receiver (105) to make the all of the said light-unit(s) to make the functions change, functions selection, light-unit for desired light-effects or light-show as pre-determined program.

From FIG. 1-1 show the light-string has desired switch or circuitry or controllers to make the said individual or special or all same or different light-unit(s) of one light-string has pre-determined light-show or light-performance. By way of example and without limitation, such as Light-string has sensor (11b), or-and IR receiver (11c) or-and Zigbi or Z-way receiver (11d) or-and RF receiver (11d) or-and wifi receiver (11f) or-and switch (105) so can control the said built-in light-string circuit or controller or wireless receiver can make all the said light-unit(s) to make desired light-function or light-show.

From FIG. 1-1 also show the said each of light-unit(s) which is not control by the light-string built-in circuit, controller, wireless receiver but has its own build-in all kind of sensors or moving detector or photo sensor or motion sensor or other market available sensor or sensor assembly to make the different or same light-units to have desired light functions. It also the said light-string (11a) has one of master-control system which has only one light-unit has circuit or controller or wireless receiver which can get electric-signal and make pre-determined light function(s) or effects and at same time can activate all rest of light-unit without the sensor or controller or wireless receivers to make same things. This will save a lot of money to add circuit, controller or wireless receiver to all of light-unit(s) in one or multiple light-strings . . . . Same as the built-in switch or sensor or wireless receiver only for light-string, so can save of big cost than add the each light-unit(s) with the switch, or sensor, or wireless receiver, or controller which is very costly.

The current invention can add the switch or sensors or wireless receiver (105) (11b) (11c) (11d) (11e) (11f) (11g) only built-in light string (11a) and activate all the Light-unit(s) (11i) (11i') (11i'') all activate at the same time.

Or/only built-in one of the light-unit (11i) with master control-system (not shown) to activate the only master-one light-unit (11i) then all rest of the light-units (11') (11") will have same as master-one (11i) to perform the same light function or light performance.

Or/Each group (11i) (Same light source light-unit) of the light-string has many group(s) (11i') (11i") has only one light-unit (11i) of each group has built-in switch, controller, sensor, wireless receiver and each time trigger the only one (11i) will trigger all light-unit (N piece of 11i) inside the each (11i) (11i') (11") group.

Or/each light unit (11i) (110 (11i") has its built-in sensor, switch, controller, wireless receivers.

From FIG. 1-1, It is appreciated that the switch or sensor(s) or wireless receiver can has all kind of arrangement to install inside of only light-string or light-unit(s) depend on market requirement.

From FIG. 1-2, show the current invention is first inventor to apply the COB (Chip on Board) LED apply for outdoor light-string applications for COB (Chip on Board) has many feature including super brightness, most simple assembled and easily installation and less labor cost. From FIG. 1-2 see the light-unit (12a) (12a') 12a") has the COB LED (12b) (12d) (12h) to supply desired brightness for illumination in rectangular shape (12b) or in linear or elongate or linear or geometric shape (12d) or in round, arc, donut, or other radius or sphere other geometric shape with desired number of LEDs on-board with eye-catching color coating in one piece which not only easily assembly but also super low cost to prevent from the complicated bonding chip or dice or dip LEDs. This is one and first one for apply the COB LEDs for outdoor light-string application. This is also the main claims of the current invention. From FIG. 1-2 also can see the cost saving to control all same or different combination light-unit(s) in one light-string which has built-in the circuitry or controller or wireless receiver on the light-string and not install on each of the Light-unit.

From FIG. 2 show the alternative embodiment for the light-unit which has more than one different light functions. The light-unit (200) has $1^{st}$ light functions is LEDs (2d) surround the edge of the light-unit (200) housing. The $2^{nd}$ light function (2c) is a projection light functions which has tube (2g) or housing-parts (2g) hold the image-carrier (2h) and higher or top of housing (not within the tube or housing-parts) refractive-lens (2i) to enlarge and project desired image or patterns or light beam (21") out to wider areas away from the light-unit (200). The $2^{nd}$ project-light (2c) is one of sphere or round or dome or half-ball construction which can rotatable or movable to change the projection image present locations. The said light-unit (200) has wire to connect the power and has sensor, or controller, or wireless receiver inside the housing-compartment (2a) which offer the said $1^{st}$ and $2^{nd}$ light functions power. This is similar with the co-inventor (#FF) U.S. application Ser. No. 12-318,470 filed on Dec. 30, 2008 now abandoned, and (#11) U.S. application Ser. No. 12/624,621 filed on Nov. 24, 2009, publication data US2010/0214541 date Aug. 26, 2010, and (#TT) U.S. application Ser. No. 12/866,832, Filed on Sep. 21, 2010 co-pending CIP or continuously filed case.

From FIG. 2-1 show the more detail for FIG. 2 for the inner parts for the $1^{st}$ light function LED (2t) is surrounding the edge (2s) to offer illumination as the above discussed all kind of light performance. The $2^{nd}$ light functions of said Light-unit (210) has light-string (2k) to supply the power to the circuit or controller (not shown) and trigger the said LEDs (2t) (2m) (2n) for $1^{st}$ and $2^{nd}$ light functions. The said $2^{nd}$ light function has LED (2n) emit the light-beam to the optional $1^{st}$ optic-lens to make all light-beam for parallel direction to emit to front image-forming or display-unit (2q) crate the lighted image and go through the refractive-lens (2r) which is located on higher position of the housing (2u) or top of inner tube, tray, holder, housing body, or tube or all those assembly which main purpose is to prevent from light-beam leakage out from these assembly. $2^{nd}$ light function can project the said lighted patterns or images as (2v) (2w) which the size depend on the selected refractive-lens focusing or size or curvature of optics-properties.

From FIG. 2-2 show the $2^{nd}$ Alternative embodiment (220) which is not same as the earlier discuss FIGS. 1, 1-1, 1-2, 2, 2-1. The light-unit (22) has the wires to get power from light-string (2k') and has the top housing parts (22a) and (22b) to offer space to inner light-source Laser (22d) and LEDs (22d') and circuitry, controller, wireless receiver, electric-parts and accessories (not shown). The $1^{st}$ light source is COB LEDs (22d') has plural of Chip LED on-board to offer the illumination and passing through the center-areas (22g) of front donut-construction front-cover (22i) with desired light effects or performance as above discussed. The $2^{nd}$ light-source is laser light-source (22d) which is located on edge of the COB LED (22d') of said edge of inner plate (22c) which is under the front top-cover (22i). The front donut top-cover (22i) has install the said grating-piece (22h) under at least or more than one, or plurality opening (G in circle) to allow laser light-source (22d) laser-beam to passing through and the said grating-piece (22h) to split or divided the higher wattage laser-beam to plurality of the lower-wattage laser-beams (22j) which is no harm to people eye or body. Wherein the said front top-cover (22i) is rotatable so can let under at least or more than Laser light-source can aim to special one or desired others one of top of grating-piece (22h) to project the laser lighted-beam or lighted-patterns or lighted-image for $2^{nd}$ light function. The said $1^{st}$ light functions can be any one of above discussed of FIG. 1, 1-1, 1-2, 2, 2-1 for illumination, for lighted-patterns, for lighted-image to the laser projection has manual changeable or auto rotating grating-piece inside the geometric top-cover so can get desired laser light functions as FIG. 22 and FIG. 2-3 preferred combinations of $1^{st}$ or $2^{nd}$ light functions.

From FIG. 2-2 or FIG. 2-3 is light-string application and the light string can be hang on house, install on ground, wall, fence, garden by nail or hook or double side tape or ground stake, ground base, ground pole, ground bar, frame, lay on garden, or garden or outdoor or backyard landscape light string . . . etc. so this can make illumination or-and projection light-beam, lighted patterns, lighted-image on wall, building, housing, patio ground for outdoor patio light, outdoor torch light, outdoor garden light, garden or outdoor or backyard landscape light string, outdoor accent light, outdoor down light, outdoor laser project and $2^{nd}$ or more light function(s), outdoor COB light with $2^{nd}$ or more function(s).

By way example but without limitation such as From FIG. 2-2 the light-string (2k') is garden torch or flood light which emit light to building for wired or wireless controller for mixed color or color changing or change light function of LED (22d') or COB (22d') LED light with high power light source(s) (22d') for each light-unit(s) (220) and have the $2^{nd}$ light source (22d) is laser light-source (22d') which has at least or more than one Laser light-source (22d') as FIG. 2-2 which project plurality of laser dot-matrix (22j), patterns or image (22j) in matrix or array or designed geometric orders to make super bright laser effects (22j) or-and the said $1^{st}$ LED or COB torch or flood light-beam (not shown) to make the housing or building or garden or fence or walls to have lighted effects or lighted pattern or-and the said illumination or desired selected one or two or both light functions . . . .

From FIG. 3 show the alternative light-string which the light-unit(s) the light-unit (301) (302) (303) has separated parts (3d) (3h') (3r) can added-on or move-out from the light unit (301) (302) (303) which are not same as FIG. 1 light unit (100) (101) (102) (103) (105) which all parts is sealed together and not add-on or move-away. The FIG. 3 is similar with co-inventor co-pending (#TT) U.S. application Ser. No. 12/866,832, Filed on Sep. 21, 2010 co-pending CIP or continuously filed case. (#FF) U.S. application Ser. No. 12-318,470 filed on Dec. 30, 2008 now abandoned, and both is CIP or continuously filed case of OM U.S. application Ser. No. 12/624,621 filed on Nov. 24, 2009, publication data US2010/0214541 date Aug. 26, 2010, family as above discussed parents or child filed case.

From FIG. 3 show the light string has conductive wire to in-parallel and in-series combination to make desired length and desired number of the light-source no like the FIG. 1, 1-1, 1-2 for one big diameter wires.

The FIG. 3 is one of market available all seasonal or holiday light-string which has snap-tight light-source or injected light-source on the light-string. The said snap light-source to add the preferred project-assembly is parent filed case with issued patent. The current invention also teach the upgrade application which to add one of texture or treated optics-lens to add-on the said snap on light-source can create the different lighted-patterns or lighted-images which is not same as parent concept for the add the project-assembly.

The FIG. 3 show the light-string has in-series and in-parallel or only in-series or only in parallel conductive-wires arrangement that assemble with the light-unit (300) of current invention that belong has more than one of light-functions. The light-unit (300) has $1^{st}$ light functions with light-source (3a) and light-beam passing through the center of donut front cover for illumination, and $2^{nd}$ light function has laser light source inside the housing with donut-shape front cover has more than one grating-piece (3b) on ring of the front donut front cover.

By way of example and without limitation, such as other preferred embodiment show on FIG. 3 the light-unit (304) (310) (320)(330) (400) (410) show following features and preferred functions.

From FIG. 3 light-unit (304) which has 2 type light functions. $1^{st}$ light source is LED or COB LED (3w) light-beam emit to center of donut type front cover (3x) supply the $1^{st}$ light function, and $2^{nd}$ plurality of light-source (3v) located on the edge of inner PCB (not shown) and go through the respectively window(s) or opening(s) of front cover (3x) and supply the $2^{nd}$ light functions from edge of the said light-unit (304). Wherein, the said center cover has texture or treated or diamond-cut optics-lens to make the inner LED or COB LEDs to get multiple time reflection and refraction to get splendid color.

From FIG. 3 light-unit (310) similar with the light-unit (304) the difference the center area of inner PCB (not shown) with flat protective-lens not same as the light-unit (304) reflective or-and refractive or-and diffusion or-and diamond-cut optics properties lens.

From FIG. 3-1 the light-unit (320) is alternative of the above discussed light-unit (304) (310). The FIG. 3-1 has $1^{st}$ light-source (31d) on center of inner PCB to supply the $1^{st}$ light-functions. The $2^{nd}$ light-source (31e) (31f) are laser light-source located on the edge of inner PCB (not shown) and has the at least one piece of grating-piece or more than one piece of grating-piece on different levels to go through $1^{st}$ one then go through $2^{nd}$ one or more inside the rotatable or movable or fixed donut front-cover's window or openings to crated plurality of the laser-beam, laser-patterns, laser-image or more splendid laser-beam, laser-patterns, laser-image after go through 2 or 3 or 4 levels more than one grating-piece(s).

From FIG. 3-1 the light-unit (330) is other alternative embodiment which has laser light-source (31k) on center position of the inner PCB (31j) as $1^{st}$ light-source to supply $1^{st}$ light function. The plurality of LED or COB LEDs are location on edge of inner PCB (31j) to make the opaque or color or semi-transparent donut front cover to have circle glow-light with desired brightness to supply $2^{nd}$ light functions.

From FIG. 4-1 has light-unit (410) has similar with FIG. 3-1 light-unit (330) which has the center of PCB (4k) is COB LEDs (4s) with plurality LEDs and the light-beam go through front dome or ½ ball or ⅔ ball or diamond-cut optic-lens or optics-cover (4p) and the optics-cover (4p) is install on the center axis (4r) of inner motor & gear set (not shown) to make the diamond-cut optic-cover (4p) to rotate or spin to make moving light effects to have $1^{st}$ light function. The $2^{nd}$ light functions is other light-source (4m) (4n) which located the inner PCB (4k) edge to supply the $2^{nd}$ light functions and $2^{nd}$ light-source light is directly emit out from donut front cover's window (not punch through) or opening(s) with non-optics properties flat protective-lens.

From FIG. 4 show the different embodiment has light-unit (400) and (401) for different light-string construction. The light-unit (400) has conductive wires inside light-strings (4d) (4e) has in-series and in-parallel arrangement. The light-unit (401) has conductive wire inside light-string has only in-parallel arrangement so can link as many as same or different light-unit(s) on the in-parallel conductive-wires inside the light-string (4i) (4h).

By way of examples without limitation such as above discussed for FIGS. 2, 2-1, 2-2, 2-3, 3, 3-1, 4-1, 4 are some embodiment of the said light-unit(s), light-source(s), light string(s) for any combinations or any arrangement to make the said at least or more than one light-functions light-unit(s) which apply for the said light-string which is different with co-inventor parent filed case (#II) U.S. application Ser. No. 12/624,621 filed on Nov. 24, 2009, publication data US2010/0214541 date Aug. 26, 2010, but is CIP or continuously of the co-pending (#FF) U.S. application Ser. No. 12-318,470 filed on Dec. 30, 2008 now abandoned, (#TT) U.S. application Ser. No. 12/866,832, Filed on Sep. 21, 2010 co-pending CIP or continuously filed case. (#QQQ) family filed case U.S. application Ser. No. 13/540,728 filed on Jul. 3, 2012, now is U.S. Pat. No. 8,834,009. It is appreciated all the parent or child filed case Features or construction or concept with its alternative or replaceable or equal functions should still fall within the current invention scope and claims coverage.

Features or construction or concept with its alternative or replaceable or equal functions should still fall within the current invention scope and claims coverage.

From FIGS. 5-1, 5-2, 5-3, 5-4 is more upgrade light-unit(s) which has more complicated light-unit(s) which has motor & gear-set or spin-device or clock movement device to make desired rotating speed to present the moving image(s) or pattern(s).

From FIG. 5-1 is one light-unit (5-1A) which can have the bulb-base or quickly connect (5-1D) with main light-string (not shown) to get power from main light-string (not shown) and power to the inner PCB (51B) circuit and control system to drive the said motor or-and gear-set (51d).

For some application the motor can use servomotor which can get desired rotating speed without gear-set or other movement device should also fall within the current invention scope and claims. The motor or-and gear-set (51D) has axis passing through the top light-source (51e) board and image-forming piece (51f) to hold with tray or holder or disc (51g) which has plurality of the optics-lens (51h) to make the said tray or holder or disc (51g) and plurality of optics-lens rotating to make the moving patterns or images which created by image-carrier (51f) while light-source (51e) light-beam emit through the said image-forming piece (51f).

From FIG. 5-2 show the alternative or more up-grade inner construction than FIG. 5-1 which has not only moving plurality of optic-lens (52g) inside the tray or holder or disc (52f) but also the tray or holder or disc (52f) center has opening to install the project-assembly (52h) 3 basic components including LED and image-forming piece such as slide or film and the front optics-lens such as refractive-property optics-lens to project the inner slide or film full color image to desired outside remote-away location including indoor or outdoor wall, fence, building, house, garden or outdoor or backyard landscape light string, garden, garage door, or indoor ceiling, walls, floor (while put on high position of indoor power by battery). The rest of the plurality moving optic-lens (52g) also can have smaller tube (52e) to help to prevent from the plurality of light-source (52d) for different colors to interfere the light-beam for some presentation. While use plurality different color light-source (52e) also can incorporate the small tube (52b) to make the each different color can traveling within the small tube (52b) so not interfere the desired light-effects. So the FIG. 5-2 show not only the moving plurality of lighted-image or lighted-patterns to move continuously path but also show the one big main-colorful image to show on center of the plurality moving lighted-image or lighted-patterns.

From FIG. 5-3 show the same inner construction of the FIG. 5-3 which inside the preferred light-unit housing (53) and connect with main light-string with quickly connector (52a) or conductive-wire (53b) though the water-sealing rubber groove (53c) to offer the multiple lighted-patterns or lighted-image project by the said plurality optics-lens (53n) inside the disc or holder (53m) and inside image-forming piece (inside tube 53k) which is aim to lower light-sources (53i) respectively for each light-source (53i) to above each tube (53K). The said disc or holder (53m) fixed on the axis from gear-set (53h) which is incorporated with lower motor (53g) which is powered by the inner circuit PCB (53e). The light-unit (53) has the housing act as the tube to prevent from the light-beam leakage out from other place except the front protective or project-lens (53q) which is well install on the top housing (53p).

From The FIG. 5-4 show the alternative embodiment of light-unit (54) for light string (54a') and the light-string is power by the built-in light-string AC-to-DC circuit (54a) or incorporated light-string outside transformer (54a).

From the FIG. 5-5 show the one of preferred contactor for light-string to get the power by prong (55a) or by bulb-base (55b) or by AC-plug wire (44c) or by outside or built-in light-string AC-to-DC or separated transformer (55d). It is appreciated the power also can get from other female outlet-receiving end (55c') to get power from other light-string's male contactors same as FIG. 5-5 show AC-plug or prong of the other light-string for linkable to connect and power more than one light-string to get desired length and desired number of light-string link together to apply for outdoor to surround whole house or partial house or patio or fence or wall or garage door, or for garden or outdoor or backyard landscape light string.

From FIG. 6 and FIG. 6A and FIG. 6B show the co-inventor current and parent filed case including the (#H-05) U.S. application Ser. No. 11/255,981 filed on Oct. 24, 2005, (#H-1) U.S. application Ser. No. 12/546,012 filed on Aug. 24, 2009, (#FF) U.S. application Ser. No. 12/914,584 filed on Oct. 28, 2010, (#II) U.S. application Ser. No. 12/624,621 filed on Nov. 24, 2009, publication data US2010/0214541 date Aug. 26, 2010, (#TT) U.S. application Ser. No. 12/866,832, Filed on Sep. 21, 2010 co-pending CIP or continuously filed case. (#QQQ-2012) U.S. application Ser. No. 13/540,728 filed on Jul. 3, 2012 now is U.S. Pat. No. 8,834,009, (#ZZZ-13) U.S. application Ser. No. 14/023,889 filed on Sep. 11, 2013 family as above discussed. Especially the (#H-05) U.S. application Ser. No. 11/255,981 filed on Oct. 24, 2005, and (#ZZZ-13) U.S. application Ser. No. 14/023,889 filed on Sep. 11, 2013 family which to has details drawing and description for apply more than one optics-lens to create the desired splendid light effects.

The current invention is CIP or continuously filed case of below Parent filed case.

(#FF-4) U.S. Pat. No. 14,967,862 filed on Dec. 14, 2015, now is U.S. Pat. No. 10,859,221
which is CIP for filing of
(#FF-3) U.S. application Ser. No. 14-539,267 filed on Nov. 12, 2014,
which is CIP for filing of
(#FF-2) U.S. application Ser. No. 14-275,184 filed on May 12, 2014, now is US patented U.S. Pat. No. 10,371,330
which is CIP for filing of
(#FF-1) U.S. application Ser. No. 12-886,832 filed on Sep. 21, 2010 now is U.S. Pat. No. 8,721,160 which is CIP for filing of
(#FF-2008) U.S. application Ser. No. 12-318,470 filed on Dec. 30, 2008 now abandoned,
which is Division for filing of which is Division for filing of
(#Q-2007) U.S. application Ser. No. 11-806,284 Filed on Dec. 15, 2007 now is U.S. Pat. No. 7,630,004
This filing is Division filing of
(#ZZZ-4) U.S. application Ser. No. 14/296,599 Filed on Oct. 18, 2016 which is Continue In Part filing of
(#ZZZ-3) U.S. application Ser. No. 14/503,647 filed on Oct. 1, 2014 now is U.S. Pat. No. 9,719,654 which is Division filing of
(#ZZZ-2) U.S. application Ser. No. 14/451,822 filed on Aug. 5, 2014, now is allowanced, which is Continue In Part filing of
(#ZZZ-1) U.S. application Ser. No. 14/323,318 filed on Jul. 3, 2014 which is Continue In Part filing of
(#ZZZ-13) U.S. application Ser. No. 14/023,889 filed on Sep. 11, 2013.
Related to the wider area image or project image night light or LED bulb or AC plug wire LED outdoor light with or without motor/spin/rotating kits for moving image.
This filing is Division filing of
(#QQQ-7) U.S. application Ser. No. 15/494,477 filed on Apr. 24, 2017
which is continue in part of
(#QQQ-6) U.S. application Ser. No. 15/355,515 filed on Nov. 18, 2016 which is continue in part of
(#QQQ-5) U.S. application Ser. No. 15/341,782 filed on Nov. 2, 2016 which is continue in part of
(#QQQ-4) U.S. application Ser. No. 15/348,218 filed on Nov. 10, 2016
which is continue in part of
(#QQQ-3) U.S. application Ser. No. 14/983,993 filed on Dec. 30, 2015
Now is allowanced which is continue in part of
(#QQQ-2) U.S. application Ser. No. 14/289,968 filed on May 29, 2014
Now is U.S. Pat. No. 9,551,477 which is continue in part of
(#QQQ-1) U.S. application Ser. No. 14/280,865 filed on May 19, 2014
Now is U.S. Pat. No. 9,581,299 which is continue in part of
(#QQQ-2012) U.S. application Ser. No. 13/540,728 filed on Jul. 3, 2012 now is U.S. Pat. No. 8,834,009 which is Division filed of
(#JJJ-1) U.S. application Ser. No. 13/296,469 Filed on Nov. 15, 2011 now is U.S. Pat. No. 8,711,216
This filing is Division filing of
(#MMM-2) U.S. application Ser. No. 15/402,965 Filed on Jan. 10, 2017

Which is continue in Part of
(#MMM-1) U.S. application Ser. No. 14/606,242 filed on Jan. 27, 2015 now is U.S. Pat. No. 9,541,260 which is Continue in Part of
(#MMM-12) U.S. application Ser. No. 13/367,758 filed on Feb. 7, 2012 now is U.S. Pat. No. 8,967,831.
Related for the LED Bulb has more than one area has illumination including head, body.

From co-inventor's parent or co-pending filed case can much easily understand the said light-string light-unit of (60) (6A) (6B) each has different $1^{st}$ optics-element (6d) or optics-lens (6k) (6r) to allow the LED or COB LED light source (6b) (6i) (6p) to emit the light-beam to $1^{st}$ optics-element or optics-lens which can be steady or rotating piece depend on market requirement. The said light-beam go through the said $1^{st}$ optic-element (6d) or optics-lens (6k) (6r) emit to the front $2^{nd}$ optics-lens (6g) (6m) (6v) and spread out the plurality of light-beam or-and lighted-patterns or-and lighted-image with steady or moving effects depend each embodiment has the axis from the gear-set and motor or from servomotor-unit or from other movement-device (not shown) to make the desired number of the Light-source or-and $1^{st}$ optics-lens or optics-element or-and $2^{nd}$ optics-lens to move, shaking, rotating, waving, spin . . . . To get moving or shaking or waving light effects as above and all above listed co-inventor parent or co-pending filed case concept or construction or drawing or description disclosure all should be still fall within the current invention scope and claims coverage.

From FIG. 7 show the same as FIGS. 5-1, 5-2, 5-3, 5-4 and difference is the light-source (7a) fit within the holder or tray or disc (7b) with optional front tube or housing parts (7c) to prevent laser-beam leakage out and emit to the $1^{st}$ grating-piece which has one or more than one grating-piece (7e) fit into one tray or holder or disc (7b) or plurality of grating-piece (7e) with different design or grating-arts so can offer plurality of different laser-beam, laser-art, laser-image, laser-patterns while laser-beam passing through the $1^{st}$ level of the laser grating-piece (7f) or plurality of $1^{st}$ level of laser grating piece (7e) (7h) inside a disc or tray or holder (7f). The laser-beam emit out from the $1^{st}$ level (7f) or $1^{st}$ laser grating-piece (7e) (7h) emit to the $2^{nd}$ (7j) or more grating piece (7k) to make more splendid laser-beam, laser-pattern, laser-image, laser-arts to emit out to indoor or outdoor locations.

From FIG. 8 and FIG. 8A show the motor (8j) and gear-set (8b) and axis (8f) and circuit (8i) and quickly contactor (8m) and conductive-wire (8n) and inner connection-wires (8k) to get power from the quickly contactor (8m) to circuit (8i) and drive the motor (8j) and gear-set (8b) and light-source (8e) to supply light-beams to top image-forming piece (not shown) or $1^{st}$ or $2^{nd}$ or more optic-element(s) or optics-lens to create the moving or shaking or waving or rotating or spin light-beam, lighted-patterns, lighted-images.

From FIGS. 8B, 8C, 8D show the above discussed same as FIGS. 6, 6A, 6B for desired combination for each light-source has preferred minimum (3) types (Times) $1^{st}$ optic-element or optics-lens has preferred minimum 4 types (TIMES) $2^{nd}$ optics-lens has preferred minimum 3 type, so total combination has 3×4×3=36 combination can easily get. By way of example without limitation such as each of the (1) light-source (2) $1^{st}$ optics-elements or optics-lens can do any arts or lens texture or treatments so it may be in hundred art or design or textures, same as (3) The $2^{nd}$ optics-lens can have hundred of texture or treatment so can become the more combination such as (1) has 100 type (TIMES) (2) 100

Types (TIMES) (30 100 Type)=100×100×100=1 Millions combination. This is the current and Co-inventor's parent filed case such as (#ZZZ-3) U.S. application Ser. No. 14/503,647 filed on Oct. 1, 2014 now U.S. Pat. No. 9,719, 654 issued and (#ZZZ-2) U.S. application Ser. No. 14/451, 822 filed on Aug. 5, 2014 now U.S. Pat. No. 10,047,922 allowed case. The same the light-unit has the $1^{st}$ and $2^{nd}$ optics-properties piece for light-string can came out millions different combination as above and drawing show on FIGS. 8B, 8C, 8D.

It is appreciated all the above discussed including co-inventor's parent, co-pending cases all the above discussed US Application Ser. Number including co-pending, allowanced, issued parent filed case all concept, idea, spirit, drawing, construction, figures, background, brief description, details description or text-boxes and content should all fall within the current invention scope and claims coverage range.

Conclusion the current invention has below features from above discussed limited preferred embodiments including;

1. From FIGS. 1, 1-1, 1-2 Light-unit(s) (100)(101) (102) (103) (104) of LED or-and Laser light-string's has more one sections has different light performance(s) (1g) (10i) (1n) (1op) (10r), comprising;
   At least or more than one injected (100) (101) (102) (104) or assembled (103) or add-on (103) light-unit(s) to form a light string.
   At least one of $1^{st}$ (1c) or $2^{nd}$ (1f) or both light sources (1k) (10d) (10m) (1w) in one light-unit (100) (101) (102) (104) (103) of said light string.
   The said light string has more than one function(s) (1s & 1n) (10u & 10p & 10r) with function selected switch (105) or controller (11b)(11c) (11d) (11e) (11f) (11g) to change functions from $1^{st}$ light source(s) (1s) to $2^{nd}$ light sources (1n)

2. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the said $1^{st}$ and $2^{nd}$ light source at least is one or more than one of LED (1c) (1v) (10s) or Laser (1k) (1w) (10m) or both (lx & 1w).

3. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the said $1^{st}$ and $2^{nd}$ light source has its parts or accessories (1f) (1q)(1y) (10n) (10q) to make desired functions.

4. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the said parts and accessories at least is one or more than one piece select from;
   i. Optics-lens (1y)(1f), reflect-lens (1y)(1f), refract-lens (1y)(1f), diffusion-lens (1y)(1f), protective-lens (1y) (1f), grating piece (1m) (1p)(1q) (10n) (10q).
   ii. From FIG. 5-1, 5-2, 5-3,5-4 Optics-lens assembly (51g) (52g)(53m) (54h)
   iii. From FIG. 5-1,5-2,5-3,5-4 Project-assembly (51e) (51f) (51g)
   iv. Image-forming (52f), display-unit (52c), piece has opening(s) (51f), cutout(s) (51f), windows (not punch through) (52c), printed (51f), stencil (51f), film (51f), slide (52f), laser contour piece, grating piece.
   v. From FIGS. 5-1,5-2,5-3,5-4 Carriers (51G) (52F) (53M) (5411) for image-forming, display-unit carrier, optics-lens, other lens is one or more of tray (22i), disc (3h) (3k), holder (5-1c), slot (3j) (3m), tube (23f), cylinder (52e), housing (2c), housing body (2c), frame (5-1C), bracket, frame (5-1C), bar (5-1C), plate (22i).
   vi. Moveable device including motor (53g), gear set (53h), clock movement (51d), rotating device (51d), spin device (51d) to make move or rotate or spin of the said image carrier (51f) or display unit (52c) or Light source (51e).
   vii. Geometric shape of outer (6v) (6m) or inner optics-lens (6s) (6k) including the at least half ball (6v) (6m), ⅔ ball assembly (6v), sphere (6m), curved (3x), prism (5-4c) (6k), variable thickness (6r)(4p), reflective (5-4d) (4p), refractive (5-4d) (4p), diffusing (6r), protective (5-13)(5-10) optics-lens.
   viii. Divider selected from housing parts (2b)(2g)(2u), frame (23k)(22g), holder (6h), tube (23f) (7c)(54g) to prevent from $1^{st}$ and $2^{nd}$ (2d & 2e)(2n & 2t) or more than one light source interfere other light source light performance or light beam or lighted image or lighted patterns.

5. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the said at least or more than one of $1^{st}$ and $2^{nd}$ or more light source supply
   (1) illumination (23p) (23q),
   (2) floor or accent light,
   (3) projection light (1g) (10i) (2v) (2w) (23K),
   (4) party (10d) or seasonal or holiday light,
   (5) steady (10u) or movable (1g) (10i) or changeable light effects (105) or multiple color light functions (105)
   (6) $1^{st}$ and $2^{nd}$ is one of optics-lens (10h) (1z) or-and optics-elements (51f) for desired combination to create light-beam (23p) (23q) or lighted-image (23K) (2i') or lighted-patterns (22J) and project out to desired remote areas.
   (7)

6. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the said at least one or more than one of light-unit(s) or whole light string has built-in activate (105) or trigger device (11b) (11c) (11d) (11e) (11f)(11g) at least is one or more than one of built-in or outside the said light-unit(s) or light-string;
   (i) all kind of sensor (11b), photo sensor (11n), motion sensor (11s), moving detectors (11s)
   (ii) IR (11c) or RF (11e) receiver and transmitter
   (iii) wireless receiver and transmitter (11g) at least is one of blue tooth (11g), z-way (11d), zigbii (11d), wife (11f), APP (11g), and download the APP related software (11f).
   (iv) built-in or outside switch (12j), function selection (12k), adjustment device (12m), setting device (12k), position or orientation adjustable device (12m) to change function between $1^{st}$ and $2^{nd}$ or more light sources.
   (v) sound (11b) or vibration (11b) or music trigger (11b) the circuit to get desired different brightness or flashing or sequential light effects as pre-determined IC or program(s).

7. From FIGS. 1, 1-1, 1-2 Light-unit(s) (100)(101) (102) (103) (104) of LED or-and Laser light-string's has more one sections has different light performance(s) (1g) (10i) (1n) (1op) (10r), the each or all of light-unit(s) has installation kits or grand stake (3xx) or base (3xx) to install on wall, insert to ground, attached to garden mud, or sit on the surface for indoor or outdoor.

8. From FIGS. 1, 1-1, 1-2 Light-unit(s) (100)(101) (102) (103) (104) of LED or-and Laser light-string's has more one sections has different light performance(s) (1g) (10i)

(1*n*) (1*op*) (10*r*), From FIG. 5 the said light string has LED (5-4A), laser (5-3A), or both light-source (102) light-unit(s) for outdoor patio, outdoor ground, outdoor floor, outdoor building torch, outdoor accent, outdoor garden light, outdoor projection light.

9. From FIGS. 1, 1-1, 1-2 Light-unit(s) (100)(101) (102) (103) (104) of LED or-and Laser light-string's has more one sections has different light performance(s) (1*g*) (10*i*) (1*n*) (1*op*) (10*r*), From FIG. 5-5 the said outdoor application light is powered by at least one or more from (i) prong (55*a*) (ii) AC-wired (55*c*) (iii) screw-base (55*b*) to get AC power source, or powered by (1) outside transformer (55*d*) (2) solar module or wind power or chemical power with energy storage device.

10. From FIGS. 1, 1-1, 1-2 Light-unit(s) (100)(101) (102) (103) (104) of LED or-and Laser light-string's has more one sections has different light performance(s) (1*g*) (10*i*) (1*n*) (1*op*) (10*r*), From FIG. 2-2 the said light-unit has center for $1^{st}$ light source (LED) for $1^{st}$ preferred light effects emit out from center of light unit, and has away center has $2^{nd}$ light source (22*d*) is laser light source and has grating-piece (22*h*) arranged on rotating or movable top cover (22*i*) having at least or more than one of opening (22*h* location) or window (not punch through) (22*h* location) to split the big watt laser light-beam split or divided to plurality of light-beams (22*j*) or lighted pattern (22*j*) or lighted image (22*j*) and emit out from the opening(s) (22*h* location) or window(s) (22*h* location).

11. From FIGS. 1, 1-1, 1-2 Light-unit(s) (100)(101) (102) (103) (104) of LED or-and Laser light-string's has more one sections has different light performance(s) (1*g*) (10*i*) (1*n*) (1*op*) (10*r*), the said rotating or movable top cover (22*i*) is ring shape so can have the center areas (22*g*) to allow the $1^{st}$ light source (LED) to emit desired light-beam or lighted patterns or lighted image out and top cover (22*i*) has ring areas has at least one or more than one opening(s) (22*h* location) or window(s) (22*h* location) has grating-piece (22*h*) installed to allow inner positioned laser light source(s) (22*d*) to emit out desired laser light-beam (22*j*) or lighted-patterns (22*j*) or lighted image (22*j*).

12. From FIGS. 1, 1-1, 1-2 Light-unit(s) (100)(101) (102) (103) (104) of LED or-and Laser light-string's has more one sections has different light performance(s) (1*g*) (10*i*) (1*n*) (1*op*) (10*r*), the said rotating or movable ring cover (22*i*) which is rotated or changed position by manual or movement device so offer light-unit(s) has (220) changeable laser light effects or performance for one of more than one light functions.

13. From FIGS. 1, 1-1, 1-2 Light-unit(s) (100)(101) (102) (103) (104) of LED or-and Laser light-string's has more one sections has different light performance(s) (1*g*) (10*i*) (1*n*) (1*op*) (10*r*), the said light performance or functions at least is one or desired combination of below listed;

(i) LED illumination (23P (23*q*), or color changing, or select functions (5-25*e*), or adjustable color, brightness, dimmable, flashing, or select moving speed and type, or color changing, or freeze color, or fade-in or fade-out or other sequential light effects.

(ii) LED projection light, laser project light with desired number of colors, or (iii) LED or laser light has $1^{st}$ and $2^{nd}$ optics-lens (6*v* & 6*s*) (6*k* & 6*m*) or-and optic-elements (6*d*) (6*h*) for project desired steady (5=16') (5-5) or movable (1*g*) (10*i*) or rotatable (1*g*) (10*i*) or traveling arc (6*h*') of lighted-patterns (6*g*') or lighted-image (6*g*') or other desired light performance (6*g*') (6*h*), or (iv) Laser projection light performance (1*n*) (10*p*) (10*r*) (5=16') (22*j*) from one or more than one laser source (1*k*) (10*m*) (22*d*) (5-8) (5-15) with desired colors combination for plurality of light-beam or lighted patterns or lighted contour patterns or lighted image.

(v) LED or-and laser light-string for illuminate or project as floor, torch, building, patio, or garden application(s) and install on the outdoor, garden, under roof, hanging on building, on the ground, install on ground by stake, pole, desk, holder (vi) garden or outdoor or backyard landscape light string 15. The light-unit(s) of light string has COB LED light source, comprising;

From FIG. 1-1 At least one of light-unit(s) (12*a*) (12*a*') install on the said light-string.

At least or more than one COB (chip on board) LEDs (12*b*) install inside the one or more than one of light-unit(s) to supply illumination.

The said light string has at least or more than one circuitry or controller that is built-in or outside of the said LED-unit(s) or outside light-string to make pre-determined light function, effects.

From FIG. 5-5, The said light-string is powered by (i) AC-wired or (ii) Solar module with energy storage device or (iii) battery.

16. The light-unit(s) of light string has COB LED light source (12*b*), the said built-in or outside light-unit(s) or light-string device is one of;

(1) function changing device, or (2) color changing or selection device, (3) adjust color, brightness, duty, cycle, period time device, or (4) is one of switch, sensor, photo sensor, motion sensor, moving detector device to trigger the light-unit(s).

(5) is one or more than one of wireless receiver and transmitter select from blue-tooth, Zway, Zigbii, wife, download APP software, RF or IR remote controller to make adjustment or activate or setting or selection of the functions of light-string or light-unit(s), or (6) is one of movement device, or motor, or clock movement, rotating device, or spin device with or without gear-set to make moving image or lighted pattern or light beam light performance.

(7) is one of sound activated device,

The said LED light-string is apply for outdoor and install on ground, patio, under roof, insert garden by stake (3*xx*), sit on ground by bracket or frame, hanging on house wall.

17. The LED string has COB LED light source, the said LED light-string has COB LED and other light-source light-unit(s) of light-string, or The LED light-string has COB LED (12*b*) and other light-source (1*k*) (10*m*) (22*d*) (5-8) (5-15) built-in one light-unit.

18. The light string has Laser light source, comprising;

At least one or more than one light-unit(s) of the laser light-string.

At least or more than one laser light-source (1*k*) (10*m*) (22*d*) (5-8) (5-15) install inside the one or more than one of light-unit(s) to supply illumination.

The said light string has at least or more than one circuitry or controller that is built-in or outside of the said light-unit(s) or outside light-string The said light-string is powered by FIG. 5-5 (*i*) AC-wired or (ii) Solar module with energy storage device or (iii) battery. Wherein the each laser light source has at least or more than one steady or movable grating-piece is in front of the laser light-source to split or divided the original bigger wattage laser light-source light-beam to plurality of lower wattage light-beams or lighted patterns.

19. The light string has Laser light source, the said built-in or outside light-unit(s) or light-string device is one of;
   (1) function changing device, or
   (2) color changing or selection device,
   (3) adjust color, brightness, duty, cycle, period time device, or
   (4) is one of switch, sensor, photo sensor, motion sensor, moving detector device to trigger the light-unit(s).
   (5) is one or more than one of wireless receiver and transmitter select from blue-tooth, Zway, Zigbii, wife, download APP software, RF or IR remote controller, or
   (6) is one of movement device, or motor, or clock movement, rotating device, or spin device with or without gear-set to make moving image or lighted pattern or light beam light performance.
   (7) is one of sound activated device,
The said laser light-string is apply for outdoor and install on ground, patio, under roof, insert garden by stake, sit on ground by bracket or frame, hanging on house wall.

20. The laser string has laser light source, the said
   Laser light-string has laser (1k) (10m) (22d) (5-8) (5-15) and other light-source (12b) light-unit(s) of light-string, or
   The laser light-string has laser and other light-source built-in one light-unit.

I claim:

1. A projection light string having at least one LED and/or laser light source, comprising;
   at least one injected or assembled or add-on light unit to form a light string that connects to a power source through an AC plug wire, AC prong, AC lamp base, or battery contacts without pigtail connection; and through a built-in or external AC-to-DC circuit,
   wherein the direct current is supplied to an integrated circuit to create at least one steady, changing, or moving light color image and/or lighted pattern for projection to a surface feet away from the light source for indoor and outdoor application,
   wherein each light unit includes at least one LED, laser, or LED and laser light source,
   wherein at least one light unit has built-in at least one of:
   (1) at least one image forming piece,
   (2) at least one optics lens or cover,
   (3) at least one laser or grating piece,
   (4) at least one film,
   (5) at least one slide,
   (6) at least one pinhole,
   (7) at least one painted or printed piece, and
   (8) at least one cutout or window;
   to form the projected images or patterns, and
   wherein the light string has more than one function selected by a switch or controller to change a first function to another function.

2. A projection light string having at least one LED and/or laser light source as claimed in claim 1, wherein the light unit includes more than one LED, laser, or LED and laser light source.

3. A projection light string having at least one LED and/or laser light source as claimed in claim 1, wherein the light unit includes first and second light sources each having its own parts or accessories to provide desired functions.

4. A projection light string having at least one LED and/or laser light source as claimed in claim 3, wherein the parts and accessories include at least one of:
   I. an optics lens, reflective lens, refractive lens, diffusion lens, protective lens, or grating piece;
   II. an optics lens assembly;
   III. a projection assembly;
   IV. an image forming element, a display unit, a piece having at least one opening, cutout, or window, a printed piece, a stencil, a film, a slide, a laser contour piece, or a grating piece;
   V. carriers for image forming, a display unit, or at least one lens included in at least one of a tray, disc, holder, slot, tube, cylinder, housing, housing body, frame, bracket, bar, and plate;
   VI. a moveable device including a motor, gear set, clock movement, rotating device, or spin device to cause an image carrier, display unit, or light source to move, rotate, or spin;
   VII. a geometrically shaped outer cover or inner optics lens including an at least half ball or ⅔ ball assembly, a sphere, a curved lens, a prism, a variable thickness lens, or a reflective, refractive, diffusing, or protective optics lens; and
   VIII. a divider selected from housing parts, a frame, a holder, or a tube to prevent one said light source from interfering with another said light source.

5. A projection light string having at least one LED and/or laser light source as claimed in claim 3, wherein at least one of the first and second light sources is for illumination and/or is included in at least one of:
   (1) a floor or accent light unit,
   (2) a garden or outdoor or backyard landscape light string,
   (3) a projection light,
   (4) a party or seasonal or holiday light,
   (5) a light unit having steady or movable or changeable light effects or multiple color light functions,
   (6) a light unit having projection optics and/or optics elements to project a predetermined combination of light beams, lighted images, or lighted patterns and to desired remote areas, and
   (7) a garden, outdoor, or backyard landscape light string with a ground stake or ground bracket to insert into the ground or to sit on top of the ground.

6. A projection light string having at least one LED and/or laser light source as claimed in claim 1, wherein the at least one light-unit or the light string has a built-in activation or trigger device including at least one of:
   (i) a sensor, photo sensor, motion sensor, or movement detectors;
   (ii) an IR or RF receiver and transmitter;
   (iii) a wireless receiver and/or transmitter with at least one of Bluetooth, Z-way, Zigbee, Wi-Fi, and an app or downloaded app related software;
   (iv) at least one of a built-in or outside switch, function selection device, adjustment device, setting device, and position or orientation adjustable device, to change a function between first and second or more light sources; and
   (v) a sound, vibration or music triggered circuit to get desired different brightness, flashing or sequential light effects control by an IC or program.

7. A projection light string having at least one LED and/or laser light source as claimed in claim 1, wherein at least one light unit has an installation kit, ground stake, or base to install the at least one light unit on a wall, in the ground, attached to garden mud, or on an indoor or outdoor surface.

8. A projection light string having at least one LED and/or laser light source as claimed in claim 1, wherein the light string is to be installed at, on, or in: (1) an outdoor patio, (2) outdoor ground, (3) an outdoor floor, (4) an indoor table or treetop, or to serve as (5) an outdoor accent light, (6) a garden, outdoor or backyard landscape light string, (7) an outdoor garden light, (8) a projection candle light, or (9) an indoor projection light.

9. A projection light string having at least one LED and/or laser light source as claimed in claim 1, wherein the light string is powered by:
   A. at least one (i) prong (ii) AC-wire (iii) or screw-base, that serves as an AC power source, or
   B. at least one of: (1) an outside transformer, (2) solar or wind power, (3) chemical power, and (4) a DC energy storage device, that serves as a DC power source.

10. A projection light string having at least one LED and/or laser light source as claimed in claim 1, wherein the at least one light-unit has a central first light source for providing first preferred light effects from a center of the light unit, and a peripheral second light source, the second light source being a laser light source and having a grating piece arranged on a rotating or movable top cover with at least one opening or window to split a high power laser light beam into a plurality of light beams, a lighted pattern, or lighted image for emission through the at least one opening or window.

11. A projection light string having at least one LED and/or laser light source as claimed in claim 10, wherein the rotating or movable top cover has a ring shape to allow the first light source to emit light beams, lighted patterns, or lighted images through a center area, and the at least one opening or window has a grating piece installed therein.

12. A projection light string having at least one LED and/or laser light source as claimed in claim 10, wherein the rotating or movable top cover is rotated or changes position by a manual or movement device to offer changeable laser light effects or performance.

13. A projection light string having at least one LED and/or laser light source as claimed in claim 1, wherein the light strings:
   (i) provides at least one (a) LED illumination, (b) color changing, (c) function selection, (d) color, brightness, or flashing adjustment, (e) moving speed and type selection, (f) color changing or freezing, (g) fade-in or fade-out and other sequential light effects;
   (ii) provides at least one LED or laser projection light function with a desired number of colors,
   (iii) includes first and second optics lenses and/or optical elements to project steady, moving, or rotating lighted patterns or images, or lighted patterns or images that travel in an arc, or
   (iv) includes at least one laser source with desired color combinations,
   (v) provides illumination of or image projection to a floor, building, patio, or garden, and
   (vi) is a light string (1) installed in an outdoor garden, (2) hung under a roof, (3) hung on a building, (4) inserted into the ground, or (5) installed on the ground by a stake, pole, or holder.

14. A light string having a one chip on board (COB) light source, comprising:
   at least one light unit installed on the light-string; and
   at least one COB light source installed inside the at least one light unit, wherein the at least one light unit also has built-in at least one of:
   (1) at least one image forming piece,
   (2) at least one optics lens,
   (3) at least one laser grating piece,
   (4) at least one film,
   (5) at least one slide,
   (6) at least one pinhole,
   (7) at least one painted or printed piece, and
   (8) at least one cutout or window;
   to form at least one tiny image or pattern that is emitted to a steady, rotating, or rotatable, front or outer:
   (a) projection lens or cover,
   (b) protective lens or cover, or
   (c) refractive lens or cover,
   to enlarge the at least one tiny image or pattern and show the enlarged image or pattern on a surface that is feet away from the at least one COB light source, without any fiber optics to supply illumination,
   wherein the light string has at least one circuit, integrated circuit, or controller built-in or outside the at least one light unit to provide steady, moving, or changing light functions and effects, and
   wherein the light-string is powered by (i) AC-wires, (ii) a DC energy storage device, (iii) DC power input through a USB male plug, or (iv) DC power or a battery.

15. The light string having a COB light source as claim 14, wherein the built-in or outside circuit or controller includes at least one of:
   (1) a function changing device,
   (2) a color changing or selection device,
   (3) a color, brightness, duty cycle, or time device adjusting or setting device,
   (4) at least one of a switch, sensor, photosensor, motion sensor, moving detector, and
   (5) at least one of a wireless receiver and transmitter selected from Bluetooth, Z-way, Zigbee, Wi-Fi, downloaded APP software, and an RF or IR remote controller, to adjust, activate, set, or selection the functions of the light string or light unit,
   (6) at least one of a movement device, motor, clock movement, rotating device, and spin device, to cause movement of an image, lighted pattern, or light beam, and
   (7) a sound activated device, and
   wherein the light-string is (1) installed on the ground, (2) hung on a patio, (3) installed under a roof, (4) supported by a stake inserted into the ground, (5) supported on the ground by a bracket or frame, or (6) hung on a house wall, to provide a garden, outdoor, backyard, or landscape light string.

* * * * *